United States Patent
Theimer et al.

(10) Patent No.: US 8,381,214 B2
(45) Date of Patent: Feb. 19, 2013

(54) EXTENSIBLE JOB SUBMISSION

(75) Inventors: Marvin Michael Theimer, Bellevue, WA (US); Christopher Andrew Norman Smith, San Francisco, CA (US)

(73) Assignee: Microsoft Corporation, Redmond, WA (US)

(*) Notice: Subject to any disclaimer, the term of this patent is extended or adjusted under 35 U.S.C. 154(b) by 1295 days.

(21) Appl. No.: 11/789,386

(22) Filed: Apr. 23, 2007

(65) Prior Publication Data

US 2007/0294697 A1    Dec. 20, 2007

Related U.S. Application Data

(60) Provisional application No. 60/798,024, filed on May 5, 2006.

(51) Int. Cl.
*G06F 9/46* (2006.01)

(52) U.S. Cl. ........................................................ 718/102

(58) Field of Classification Search ........................ None
See application file for complete search history.

(56) References Cited

U.S. PATENT DOCUMENTS

| | | | | |
|---|---|---|---|---|
| 5,592,654 | A  * | 1/1997 | Djakovic | 710/8 |
| 6,757,695 | B1 * | 6/2004 | Noveck et al. | 1/1 |
| 6,915,354 | B1 * | 7/2005 | Ozdemir et al. | 710/5 |
| 7,433,808 | B1 * | 10/2008 | Raghavan et al. | 703/2 |
| 7,503,027 | B1 * | 3/2009 | Zhao et al. | 716/104 |
| 2002/0030851 | A1 * | 3/2002 | Wanda | 358/1.15 |
| 2003/0093245 | A1 * | 5/2003 | Schmit | 702/186 |
| 2003/0120709 | A1 * | 6/2003 | Pulsipher et al. | 709/106 |
| 2003/0142350 | A1 * | 7/2003 | Carroll | 358/1.15 |
| 2006/0010131 | A1 * | 1/2006 | Chisholm et al. | 707/9 |
| 2006/0064498 | A1 * | 3/2006 | Hendren | 709/228 |

* cited by examiner

*Primary Examiner* — Emerson Puente
*Assistant Examiner* — Adam Lee
(74) *Attorney, Agent, or Firm* — Gonzalez Saggio & Harlan LLP

(57) ABSTRACT

Briefly, aspects of the subject matter described herein relate to job submission. In aspects, a client (which itself may be a scheduler) sends a request to a scheduler to execute a job. The client may indicate which extensions to a base job submission protocol the client supports. The scheduler may implement a base case protocol and may also implement extensions to the base case. The client and scheduler may communicate information and requests about a job based on extensions both support, if any. The scheduler maintains state information about executing jobs that may include substate information without affecting interoperability with clients that do not recognize substates. A job may be in multiple substates at the same time.

19 Claims, 10 Drawing Sheets

US 8,381,214 B2

EXTENSIBLE JOB SUBMISSION

CROSS REFERENCE TO RELATED APPLICATION

This application claims the benefit of U.S. Provisional Application No. 60/798,024, filed May 5, 2006, entitled AN EXTENSIBLE JOB SUBMISSION DESIGN, which application is incorporated herein in its entirety.

BACKGROUND

Although desktop and supercomputers have continued to increase in speed, there seems to be an insatiable need for even more computing resources. Applications that fold genes, calculate weather, or perform other sophisticated calculations consume tremendous amounts of computing resources. Special purpose supercomputing centers may employ thousands of nodes that may work together to solve complex problems. Some programs allow desktops that are not currently being used to be assimilated via the Internet into solving problems. Instead of trending to solving problems on a single computer because of its increased processing speed or a single supercomputing center, the increase in performance of computers as well as the global connectivity has provided a tremendous opportunity to bring worldwide computing resources to bear on solving incredibly challenging problems.

SUMMARY

Briefly, aspects of the subject matter described herein relate to job submission. In aspects, a client (which itself may be a scheduler) sends a request to a scheduler to execute a job. The client may indicate which extensions to a base job submission protocol the client supports. The scheduler may implement a base case protocol and may also implement extensions to the base case. The client and scheduler may communicate information and requests about a job based on extensions both support, if any. The scheduler maintains and may send state information about executing jobs that may include substate information without affecting interoperability with clients that do not recognize substates. Sent information may indicate that a job is in multiple substates at the same time.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Figure 1:
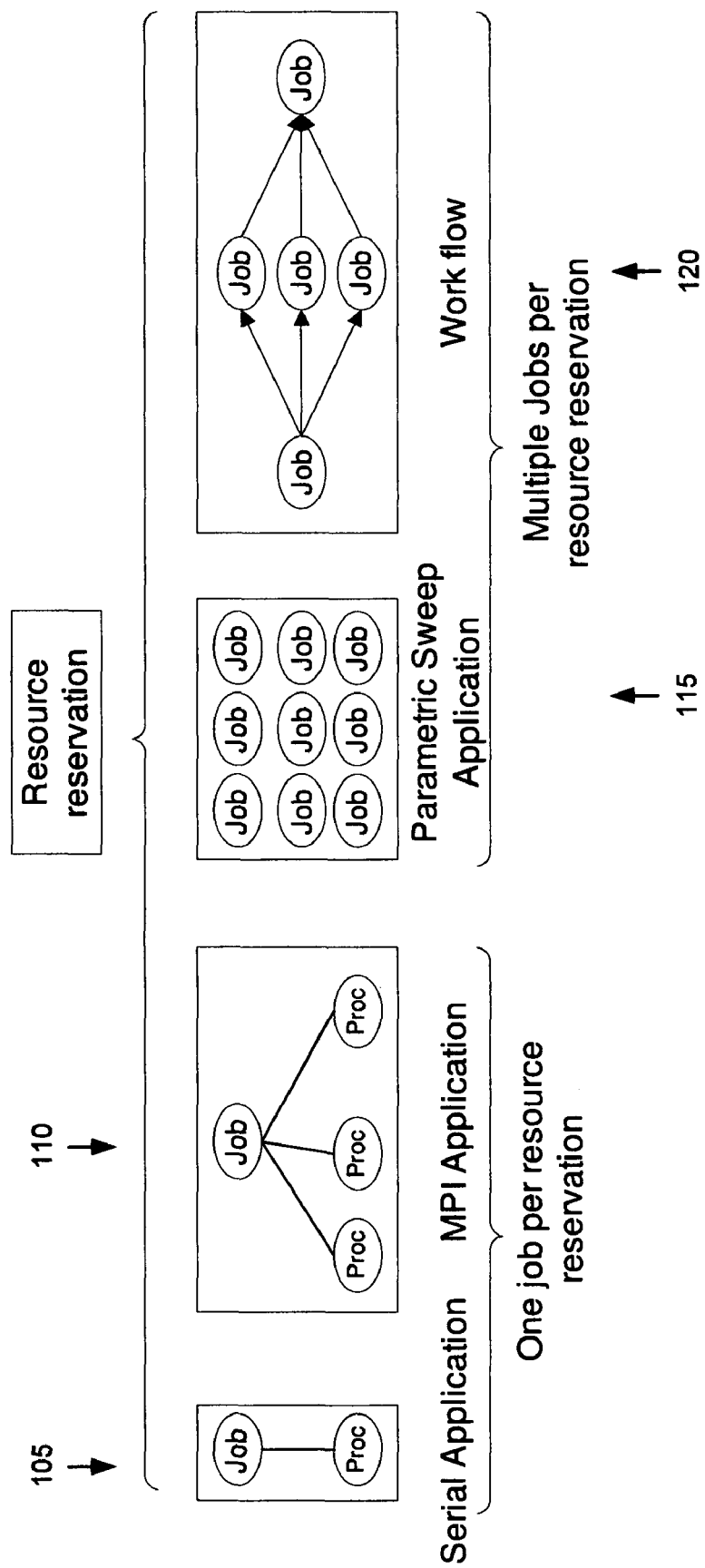
FIG. 1 is a block diagram that illustrates several different kinds of relationships between reserved resources and jobs in accordance with aspects of the subject matter described herein.

A base interoperability interface includes a set of interaction protocols and a profile specifying how these protocols are composed. In one embodiment, all parties (e.g., all clients and all job scheduling services) are expected to implement the base interoperability interface, which provides a base interoperability use case (sometimes referred to as a "base case"). Additional functionality may be exposed by schedulers via optional extensions that allow common interoperability use cases. Clients (and schedulers acting as clients) determine which extensions a particular scheduler supports and interact with the scheduler via the base interface and whichever extensions that both parties understand.

Extensions may include both extensions to existing interaction protocols as well as definitions of new interaction protocols. Although clients are free to mix and match available extensions as they see fit, extension profiles may also be defined to describe particular types of functionality that include the composition of multiple extensions In job submission systems, a job represents a user-defined program to be carried out by one or more execution subsystems. Execution subsystems may actually execute a job or they may be "proxies" that hand off a job to another execution subsystem for actual execution. As used herein, an execution subsystem that actually executes a job is referred to as a compute node (which may be physical or virtual in nature). In some embodiments, a job may run on a single compute node. In other embodiments (sometimes referred to as an "extended use case"), a job may run on more than one compute node. An extension in support of parallel, distributed programs allows job schedulers to advertise what kinds of infrastructure support they have for running various kinds of parallel, distributed programs (e.g., MPI jobs) and clients to specify relevant information needed to correctly instantiate such programs.

MPI stands for "Message Passing Interface" and represents a standard means of message-based communication employed by many parallel, distributed, high-performance computing applications. MPI applications typically consist of multiple processes, each running on a different CPU, that collectively implement the application.

Compute nodes employ resources to execute jobs. Resources represent things like compute node CPUs, the amount of memory to be allocated to a job on a compute node, the amount of disk space to make available to a job on a compute node, and so forth. Resources may be referred to in aggregate, such as the number of compute nodes or CPUs needed to run an MPI program. When referring to something like a compute node, aggregation represents a "bundle" of associated resources that may be dealt with as a single (logical) unit. When referring to something like the number of CPUs needed to run an MPI program, aggregation represents the number of units of some resource that are needed. Resources may also be referred to in boundary specifications, such as a minimum amount of memory needed to run some job.

Schedulers manage the process of allocating resources to jobs. Two aspects of resource allocation are the notions of resource allocation rights and resource reservation. A scheduler may allocate particular resources to a job if the scheduler has the right to allocate those resources. Since resources may be under the actual control of another entity (e.g., the resources of a compute node may be controlled by the compute node), a scheduler may first reserve a given set of resources in order to have the right to subsequently allocate them to a job or to another entity in the form of a granted reservation.

Resource reservation may imply immediate reservation (or at least immediate reservation once the reservation has been granted) of resources or advanced reservation of resources to be used at some specific later point in time. In immediate reservation, once a reservation has been granted, the owner of the reservation has rights to use/allocate the reserved resources immediately, as well as at any time in the future until such time as the reservation expires or is terminated.

Resource allocation may involve at least three different types of interactions, each of which may occur independently and at different times.

First, a client or scheduler may query various parties about the availability of resources within a system. Such information queries may be directed to the owners of resources (i.e. those possessing the right to allocate them) or to various kinds of information services that keep track of resource information in one form or another.

Second, a client or scheduler may make reservation requests to obtain allocation rights to various resources within a system. Note that in a system in which resource reservation is not explicitly supported there is an implicit assumption that a given job scheduler has, by some out-of-band means, obtained the right to allocate the resources that it schedules. That is, it has implicitly reserved the resources of the compute nodes on which it will subsequently schedule jobs. The notion of "delegating" resources to another scheduler via reservations is described in more detail below as a basis of an extension that supports multi-scheduler environments.

Finally, a scheduler may allocate resources for which it has allocation rights to either jobs or to parties that make reservation requests to it. In the latter case, the scheduler is acting as a resource provider. Note that in the former case, when a scheduler allocates resources to a job, the scheduler is doing so on behalf of the client that submitted the job. If the client explicitly reserved resources from the scheduler beforehand, then the scheduler may employ those resources for the allocation. If the client submitted a job to the scheduler without first explicitly reserving resources for it, then the client submission implicitly performs the reservation for the client.

Explicit resource reservations and running jobs within the context of a given resource reservation provide many capabilities including making advanced reservations that take hold at a future point in time and being able to provide quality-of-service guarantees. For example, FIG. 1 is a block diagram that illustrates several different kinds of relationships between reserved resources and jobs in accordance with aspects of the subject matter described herein.

In FIG. 1, two instances—a serial application 105 and an MPI application 110—are shown in which a resource reservation is employed to run a single job. Note that the MPI job consists of multiple processes, which run on multiple compute nodes.

Reserved resources may also be used to run multiple (concurrent) jobs, as illustrated by the parametric sweep 115 and the work flow 120 instances shown. In these cases, a scheduler may control which resources will be used to execute the parametric sweep 115 and the work flow 120 jobs. In particular, a scheduler may both limit how many resources will be consumed by either as well as guarantee that a given set of resources will be available during the entire span of executing multiple jobs.

The state of a job represents the current state of an executing (or pending-to-be-executed) program(s) associated with the job. Clients may request changes to the state of a job, including cancelling it and modifying its resource requirements/limitations.

Figure 2:
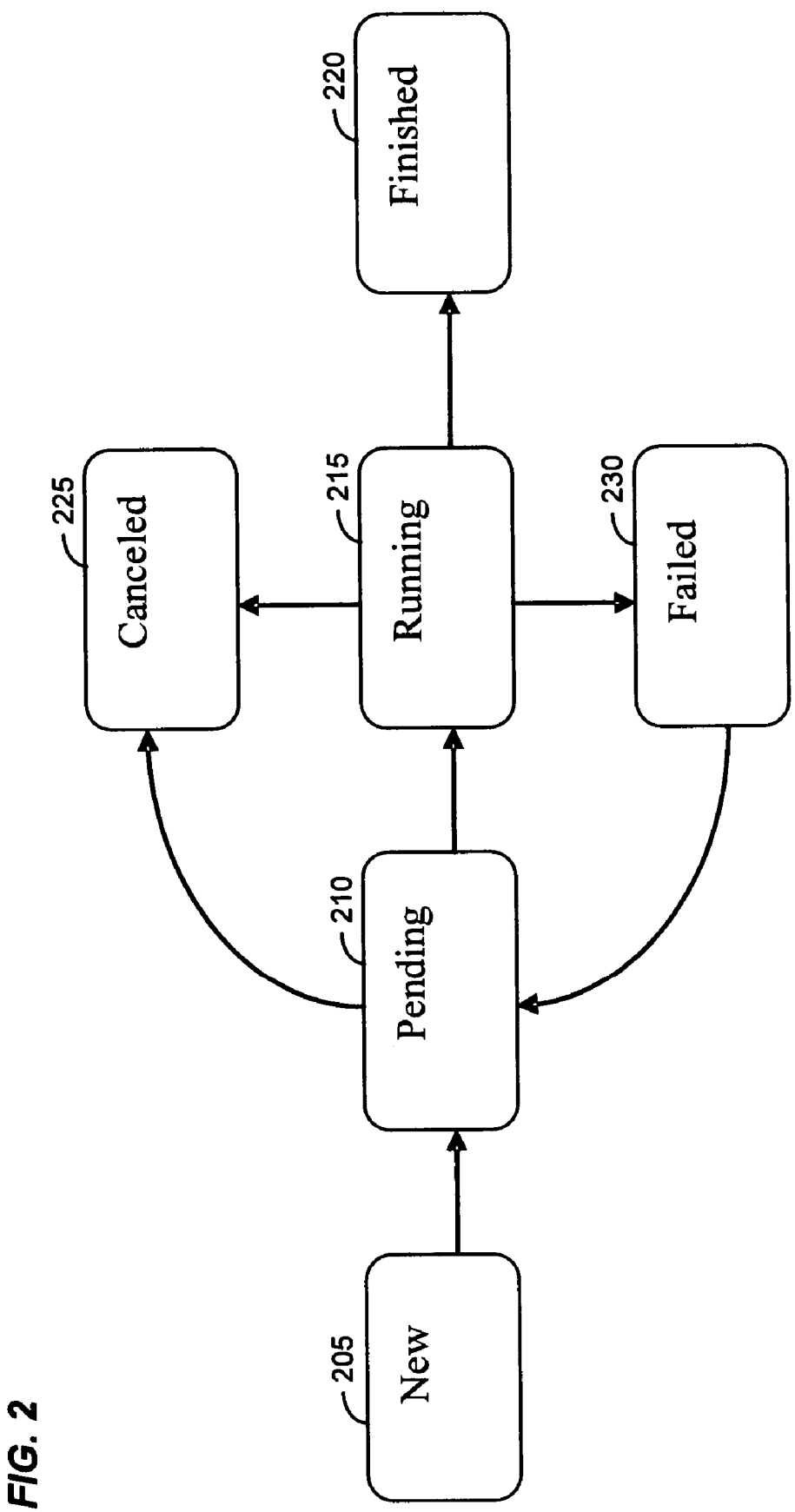
FIG. 2 is a state diagram that illustrates states in which a job may be in accordance with aspects of the subject matter described herein.

FIG. 2 is a state diagram that illustrates states in which a job may be in accordance with aspects of the subject matter described herein. The diagram illustrates the states supported by one exemplary base use case. It will be recognized that aspects of the subject matter described herein may also be applied to other base use cases. For example, a base use case state diagram may have a single terminal state instead of the three shown in FIG. 2. As another example, the pending state 210 may be removed in another base use case state diagram. As yet another example, data stage-in and/or state-out states may be added may be added in yet another base use case state diagram. Those skilled in the art will recognize many other base use state diagrams to which aspects of the subject matter described herein may be applied. A state diagram (such as the one shown in FIG. 2) may be specialized to support richer scheduling semantics as described in more detail below.

The base set of states in which a job may be includes:

New 205: This is the start state, in which a request to create the job has not yet been submitted to the scheduler by a client.

Pending 210: The scheduler has accepted the job request but not yet sent it anywhere for actual execution.

Running 215: The job is executing on some set of resources.

Finished 220: The job has terminated. This is a terminal state.

Cancelled 225: The client—which may be some system administrator (and hence not necessarily the client who originated the request to create the job)—has issued a cancel job request. This is a terminal state.

Failed 230: The job has failed due to some system error condition, such as failure of a compute node that was providing some (or all) of the resources reserved to the job that the job is part of. Failed jobs may return to the pending state if they have been marked as "re-executable" and the scheduler's policy supports this "requeuing" option. For non-re-executable jobs this is a terminal state.

Figure 3:
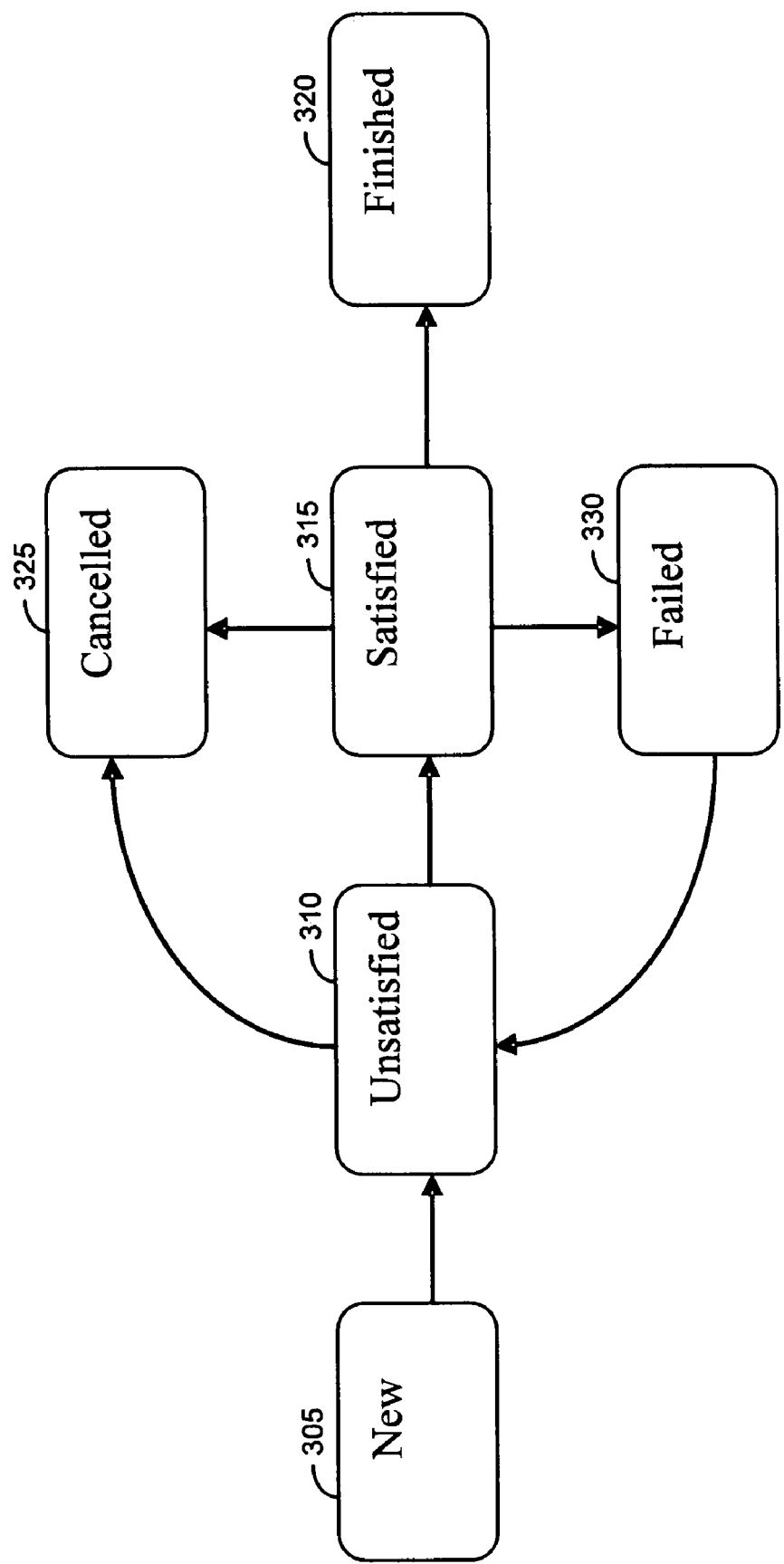
FIG. 3 is a state diagram that illustrates states in which a resource reservation may be that accords with aspects of the subject matter described herein.

FIG. 3 is a state diagram that illustrates states in which a resource reservation may be that accords with aspects of the subject matter described herein. The base set of states in which a resource reservation may be comprises:

New 305: This is the start state, in which a request to create the reservation has not yet been submitted to the scheduler by a client.

Unsatisfied 310: The scheduler has accepted the request and is trying to reserve the resources that have been requested.

Satisfied 315: The scheduler has reserved the resources requested.

Finished 320: The reservation has terminated and the resources returned to the ownership of the scheduler. This is a terminal state.

Cancelled 325: The client—which may be some system administrator (and hence not necessarily the client who originated the reservation request)—has issued a cancel reservation request. This is a terminal state.

Failed 330: The reservation has failed due to some system error condition, such as failure of a compute node that was providing some (or all) of the resources reserved. Failed reservations may return to the unsatisfied state if they have been marked as "re-reservable" and the scheduler's policy supports this "retry" option. For non-re-reservable jobs this is a terminal state.

Both jobs and resource reservations have finite lifetimes. A job that runs for longer than its specified lifetime may be automatically cancelled by the system. A resource reservation that has been in existence for longer than its specified lifetime may also be automatically cancelled by the system and the resources that it holds may be released for use by others. Both jobs and resource reservations may be explicitly terminated by means of client cancel requests.

The lifetime of a job or reservation may be queried and modified by clients (with modifications subject to scheduler approval). One scenario for resource reservations is that they expire if no job has been run in their context for a specified amount of time. This may be implemented by allowing a scheduler to automatically extend the lifetime of a reservation every time a job is submitted under its context. Clients may specify whether this auto-extension policy may be employed for a reservation when the reservation is created or may send an appropriate modification request to a scheduler.

In one embodiment, an extension allows clients to optionally specify a callback address at which to be informed when a job or reservation has terminated and/or when it has changed state.

In an embodiment, multiple schedulers may be present in a system and may employ each others' services. In this embodiment, some schedulers act as resource providers while others act as resource schedulers.

Figure 4:
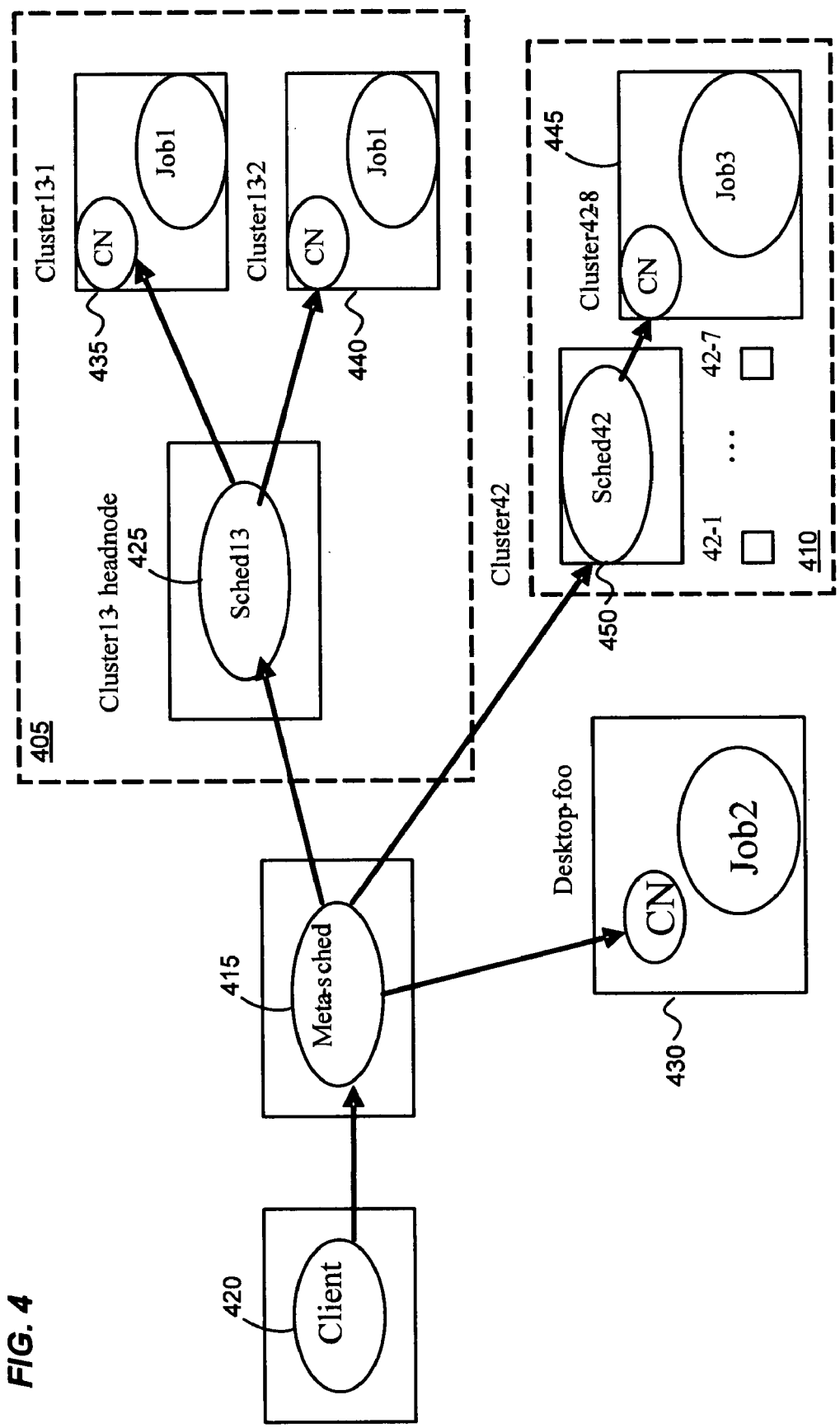
FIG. 4 is a block diagram that illustrates a meta-scheduler that schedules jobs on compute clusters and desktop machines in accordance with aspects of the subject matter described herein.

For example, an organization may run a "meta-scheduler" that schedules jobs across a forest of compute clusters, with each compute cluster running a dedicated scheduler on its head node that is responsible for scheduling jobs within that compute cluster. This results in a hierarchical scheduling infrastructure, wherein clients may submit their jobs to the meta-scheduler, which may then employ the services of each compute cluster's scheduler in order schedule jobs on the compute nodes within that cluster. FIG. 4 is a block diagram that illustrates such an embodiment as well as showing desktop machines being scheduled directly by the meta-scheduler in accordance with aspects of the subject matter described herein.

In this embodiment, the scheduler for an individual compute cluster (e.g., cluster 405 or cluster 410) may receive job requests directly from "internal" clients as well as from the meta-scheduler 415. The implications for the meta-scheduler 415 are that it may not assume that it "owns" the resources managed by each compute cluster's scheduler. Rather, the meta-scheduler 415 may assume an "advertising" model, in which compute cluster schedulers advertise their resources to both clients and the meta-scheduler. Consequently the meta-scheduler 415 may confirm that its understanding of the availability of resources within a given compute cluster actually correspond to the cluster's current state. Resources may become allocated to a specific client or meta-scheduler (acting on behalf of a client) when a resource reservation request causes them to be explicitly reserved.

Given the potential autonomy of schedulers (actual autonomy may be controlled by policy), it is possible to have systems in which there are multiple meta-schedulers and/or multiple layers of meta-schedulers. These systems may encounter resource reservation cycles.

One way of dealing with this problem, that does not impose some "structural" means of preventing cycles from occurring, is to have resource reservation and job submission requests record which schedulers (and meta-schedulers) are involved in them. That is, such requests include a description of whom they are on behalf. This description lists the "path" of schedulers that have made job creation requests of which the current request will be a part. Inclusion of such a list allows a scheduler to detect and hence prevent cycles by scanning the list associated with a given request for its own presence in the list. Thus, for example in FIG. 4, if the client 420 were to issue a job submission request to the meta-scheduler 415, which in turn issued a job submission request to the scheduler 425, then the scheduler 425 may check the associated path list to verify that it is not on the list. If the scheduler 425 were then to issue a job submission request to the meta-scheduler 415, the path list for that request would include the meta-scheduler 415 and the scheduler 425. The meta-scheduler 415 parses the list and sees its name and may reject the request so as to avoid creation of a scheduling cycle.

Viewed as "black boxes", individual compute nodes (such as compute node 430) may be viewed as special instances of schedulers. That is, they may act like resource-managing schedulers that also happen to actually execute the jobs that are submitted to them. By the same token, resource-managing schedulers are free to employ other means for interacting with resources that they are managing. Thus, for example, the scheduler for a compute cluster may employ an alternative internal protocol for interacting with the compute nodes for which it schedules resources. This may be used, for example, both for dealing with legacy systems as well as systems that may have an optimized internal or proprietary means of scheduler/compute-node interaction.

When clients and schedulers request status information about jobs and resources, to be helpful, that information may be presented in a form that is meaningful to them. In one embodiment, this means that all schedulers and compute nodes whose names may show up in information returned to a client have globally meaningful and unique names. Similarly, all jobs may also have globally unique names or IDs. The precise nature of these is something that may be defined in specific job scheduling profiles.

Information describing resources may also be encoded according to some commonly understood resource model, such as Common Information Model (CIM) or the Grid Laboratory Uniform Environment (GLUE) schema. The choice of resource model to use is defined in specific job scheduling profiles.

Scheduling information about jobs and resources has (at least) two representational aspects to it: information about the job or resource itself and information about the set of schedulers involved with setting up and managing a given job or available/reserved resource. This leads to two different views of scheduling information:

1. A flat view presenting information relative to the individual scheduler or compute node that is most directly associated with the information.

2. A hierarchical view presenting information relative to the path of schedulers and compute nodes that are involved with the information.

For example, referring to FIG. 4, suppose the client 420 has created a resource reservation with ID 137 that includes reserved resources on compute nodes 435 and 440 in compute cluster 405, compute node 430, and compute node 445 in compute cluster 410. The request to create reservation 137 was submitted by the client 420 to the meta-scheduler 415, which in turn employed the schedulers 425 and 450 to reserve resources on the machines in the clusters 405 and 410. The meta-scheduler 415 directly reserved resources on the desktop machine 430. In the context of reservation 137, Job1 is an MPI program running on compute nodes 435 and 440. Job2 is a serial program running on the desktop machine 430. Job3 is another serial program running on the compute node 445.

A flat listing of the reservation and the jobs running in its context may look as follows:
Reservation 137
    Cluster13-1:
        1 cpu, 512 MB mem, 100 GB dsk
        Job1: mpiexec foo.exe-p bar . . .
    Cluster13-2:
        1 cpu, 640 MB mem, 200 GB dsk
        Job1: mpiexec foo.exe-p bar . . .
    Desktop-foo:
        1 cpu, 512 MB mem, 100 GB dsk
        Job2: baz.exe . . .
    Cluster42-8:
        1 cpu, 512 MB mem, 100 GB dsk
        Job3: bong.exe . . .

A hierarchical listing of the job may look as follows:
Reservation 137
    Meta-sched:
        Sched13:
            Cluster13-1:
                1 cpu, 512 MB mem, 100 GB dsk
                Job1: mpiexec foo.exe-p bar . . .
            Cluster13-2:
                1 cpu, 640 MB mem, 200 GB dsk
                Job1: mpiexec foo.exe-p bar . . . .
        Desktop-foo:
            1 cpu, 512 MB mem, 100 GB dsk
            Job2: baz.exe . . .
        Sched42:
            Cluster42-8:
                1 cpu, 512 MB mem, 100 GB dsk
                Job3: bong.exe . . .

Schedulers and compute nodes may advertise their current state (both available resources and, optionally, the state of all resources they are managing) ways including the following:

1. Compute nodes and schedulers may announce themselves to other schedulers by means of an announcement message. In one embodiment, this message may inform its recipient(s) of the existence of the sender, including an end-point reference for the sender's job submission interface. The message may also optionally include additional information about the current state of the sender.

2. Interested parties may query a scheduler or compute node directly to ask it for its current state.

3. Announcement and query may also be mediated through the use of a registry service. Compute nodes and schedulers may register themselves in a directory, such as one based on Universal Description, Discovery and Integration (UDDI), and then interested parties may find schedulers within the registry and subsequently poll the schedulers for their resource information.

In an embodiment, advertisement of resources may be performed in ways including:

1. Compute nodes and schedulers may periodically announce themselves, including, optionally, their current state, to other schedulers. Announcements may occur whenever a compute node or scheduler has experienced a significant change-of-state.

2. Schedulers may periodically query compute nodes and other schedulers for their current state. In another embodiment, compute nodes and schedulers initially announce themselves to other schedulers and then those schedulers periodically query the compute nodes and schedulers for their current status.

The choice of whether to have information propagated via periodic announcement messages or periodic query messages may depend on circumstances. Use of announcement messages allows information about resource state changes to propagate immediately to schedulers that may be interested in that information. Use of query messages allows schedulers to tailor what kind of information they wish to receive from compute nodes and other schedulers at any given time. It also provides schedulers with better control over how often they process message traffic. A (centralized) scheduler may control the rate at which it queries a set of compute nodes and/or schedulers for information. If announcement messages are employed then the scheduler may either risk the possibility of being overwhelmed by a flurry of concurrent announcement messages or may employ some means of coordinating the generation of announcement messages so that they are spread out over time. Announcement messages may be registered for via a protocol such as WS-Eventing.

When a client requests the creation of a reservation or job at some scheduler, a unique ID may be returned to allow future interactions concerning that reservation or job. The scheduler should maintain knowledge of that ID for at least as long as the reservation or job remains in existence. In particular, if the scheduler crashes and recovers while the reservation or job continues unaffected on another machine, then, in one embodiment, the scheduler is able to successfully field subsequent client requests referencing the reservation or job. In this embodiment, the scheduler may maintain persistent state information about existing reservation and jobs or have some equivalent means of obtaining that information (e.g. by querying known compute nodes on which a reservation or job may exist).

In one embodiment, a recovery model may include:

1. Resources that have been reserved and are deemed no longer reachable result in a new resource reservation request to be fulfilled by other (currently reachable) resources. Unreachable resources are marked as such and are deleted from the reservation they were associated with. In the base use case, resources marked as unreachable are not automatically reintegrated into a reservation. However, in some extended use cases, clients may depend on specific resources and wish to have such resources be automatically reintegrated into their reservations (with the reservation remaining in a 'pending' state in the mean time).

2. A job that has declared itself as "re-executable" and that is running on resources that are deemed no longer reachable may result in a new job execution request that is fulfilled by other (currently reachable) resources belonging to a reservation. A non-re-executable job running on unreachable resources may result in an abnormal termination response to its initiating client. Unreachable jobs are designated as "orphan" jobs and schedulers may send a termination request to them if they become reachable at any time in the future. In one embodiment, orphan jobs eventually terminate due to exceeding their lifetime limits. In another embodiment, when a scheduler has created a second instance of a re-executable job and the unreachable (first) instance of the job becomes reachable again, the scheduler may choose to send a termination request to the second instance instead of the first one.

In one embodiment, the failure/recovery model allows that reservations may at times have more resources reserved to them than a client has requested, re-executable jobs have "at least once" execution semantics, and non-re-executable jobs have "at most once" execution semantics.

Initiating clients and schedulers may decide when resources are deemed to be unreachable. On the other hand, resource reservations and job executions may not be prematurely terminated by the compute nodes on which those resources and jobs reside. Thus, for example, a scheduler may choose to wait a considerable time before declaring a long-running job to be unreachable in the hope that its unreachability is due to a network partition and not a crash of the compute node running the job. Alternatively, the scheduler may aggressively declare jobs unreachable in order to achieve minimum job completion times in exchange for sometimes initiating unnecessary redundant job execution requests.

Clients may also be able to indicate their preferences to the scheduler by including such preference information in their reservation and job creation requests. System administrators may be able to control the scheduler's behavior by specifying appropriate policy settings via a system management interface to the scheduler. Resource descriptions for compute nodes may include information about their typical reachability. An extensible approach to resource description allows compute nodes and schedulers to optionally exchange this kind of information.

One feature of re-executable jobs is that they be able to tolerate having several instances of themselves running simultaneously in parallel. This precludes any job that would, for example, generate output to a specific global storage location that is the same across multiple executions of a job and that does not have a means of detecting when other instances of the job are already running.

Clients and schedulers may determine the reachability of resources through periodic state queries of the associated schedulers and compute nodes or by monitoring expected periodic announcement messages from them. Employment of periodic query messages or monitoring of periodic announcement messages may set up an implicit "connection" between various parties. In one embodiment, in such implicit "connections" there may not be a notion of lifetime. There is, however, a notion of one party being able to tell the other that it is about to drop out of the connection.

Client users of a system's scheduling services are may have credentials that allow them to prove their identity to schedulers. In one embodiment, the credentials are user-name/password pairs. In other embodiments, other kinds of credentials including those based on X.509 certificates are also possible. Similarly, schedulers may also have credentials that allow both end client users and other schedulers to verify a scheduler's identity. When scheduler credentials are based on public/private key pairs, then arbitrary clients may verify a scheduler's identity without having to know any secret information about it (such as the user-name and password of the account it runs under). Other kinds of credentials for schedulers may also be used without departing from the spirit or scope of the subject matter described herein.

In one embodiment, WS-Security is used to ensure the integrity and privacy of message interactions among clients, schedulers, meta-schedulers, and compute nodes implementing the interfaces described herein. This embodiment does not preclude the attachment of "leaf" systems whose internal implementations employ alternative means. For example, a Windows® Compute Cluster Server (CCS) compute cluster scheduler that employs a proprietary interaction protocol with the compute nodes it controls may be used in accordance with aspects of the subject matter described herein.

In order to allow efficient interactions spanning multiple messages between two parties, secure conversations may be employed for all interactions unless the policies governing the interactions between two specific parties explicitly allow for non-secure interactions. Non-secure interactions may forego encryption and integrity support while still requiring authentication and access control. The identities used to establish each secure conversation between two parties may comprise the identities of the directly communicating parties. For example, a meta-scheduler acting on behalf of a client may use its own credentials instead of the client's credentials when establishing a secure conversation with another scheduler (or compute node).

Credentials may be used in multiple ways, including:

1. For authentication purposes, both as part of establishing a secure conversation between two parties and to establish the identity of someone making a request to a scheduler (or a compute node)—or on whose behalf a scheduler request is being made.

2. For authorization purposes in that scheduler requests are executed if they are authorized for the credential on whose behalf they are being made.

3. For delegation purposes in that jobs are run with credentials that allow them to access various resources, as well as request various actions within the system.

Scheduler requests may involve multiple credentials. In addition to the implicit credential needed to establish a secure conversation over which a scheduler request may be made, each scheduler request may also include an explicit client credential parameter that identifies the ultimately originating client on whose behalf the request is being made. Specifically, resource reservation requests may contain a job credential parameter that specifies credentials to be given to any job that is run as part of the created reservation.

Job creation requests may also contain a job credential parameter as well. The credentials given to a job may include the union of the credentials given to the resource reservation the job is running under and the credentials specified explicitly for the given job in its creation request. In the case of user-name/password credentials, the union of two user-name/password credentials may not be supported by the underlying operating system asked to run a job. In that case an error may be returned to the job creation request.

The following examples illustrate the use of credentials in multi-scheduler settings:

In a first example, a system may contain client C, meta-scheduler M, cluster scheduler S, and compute node N. C may send a reservation request to M, which may cause M to send a reservation request to S, which may in turn send a reservation request to N. The secure conversation between C and M is created using the credentials of C and M. Similarly, the secure conversation between M and S is created using the credentials of M and S, and so forth. The client credential parameter of each reservation request contains the credentials of C, since each reservation request is ultimately on behalf of C. Similarly, the job credential parameter of each job creation request also contains the credentials of C, if each job to be run under the job is to run with C's credentials. If C wanted to run its jobs using different credentials, then it supplies different credentials in the task credential parameter.

In another example, C requests that job J be created and run under the newly created reservation R. To do so, a job creation request is issued by C to M, which issues a subsidiary job creation request to S, which in turn issues one to N. N then launches J as a program running with the union of the credentials provided by the resource reservation and job creation requests it received.

If C wants to cancel the job then C may send a cancel job request to M, which issues a subsidiary cancel job request to S, which issues one to N. The client credential supplied in each of these requests is C, indicating that the cancellation is being requested on behalf of C and that authorization checks for the cancellation request be done against C's identity.

If client, A, with administrative privileges, wants to cancel a job that C created, A may send a cancel job request to any of M, S, or N. The request may contain A's credentials as client credential parameter, indicating that the request is on behalf of A and that authorization checks should be run against A's identity (and authorization privileges). If A sends the request to M, then M would send a cancel job request to S, and S would send one to N. In each case the client credential parameter contain A's credentials.

If A wants to run a job under reservation R (running with C's job credentials), A may issue a create job request with its own credentials as client credential and null credentials as job credential (so that R's job credentials get used as the credentials assigned to the job).

Schedulers and compute nodes may maintain a variety of policy information in order to implement both authentication and authorization of requests. For example, they may maintain a list of the credentials of all clients and schedulers that may establish a secure conversation with them. As another example, they may also maintain authorization information specifying on behalf of which clients various scheduler requests may be made. As yet another example, they may maintain authorization information specifying which schedulers may make requests on behalf of various clients. This last type of policy information may be a matrix keyed on both the originating client and the immediately requesting party—which may be the originating client or an intermediate scheduler.

Because intermediary schedulers may not know whether a job creation request to another scheduler (or compute node) will be rejected due to restrictions on which resources a user is authorized to use, they may be configured to search for other resources when trying to fulfill the resource reservations specified in a job creation request.

Policies may be defined in a job submission protocol profile document. As an example, a set of policies may include a well-known, secure, virtual organization-wide database that is maintained of clients and schedulers who may establish secure conversations with each other. Any member of this database may establish a secure conversation with any other member.

Clients may create resource reservations whose jobs run with their credentials. Clients may cancel jobs and reservations that have been created on their behalf (typically by themselves, although an administrator may also have done so). Clients may modify their own jobs and reservations, subject to restrictions placed by schedulers (such as maximum lifetime or maximum resource request limits).

Any scheduler may query any other scheduler, as well as send announcement messages to any other scheduler.

Only administrators may issue scheduler modification requests. In general, administrators may issue any request to a scheduler that they wish to. More, fewer, or different policies may be defined without departing from the spirit or scope of aspects of the subject matter described herein.

In embodiments that use username/password combinations as client credentials, schedulers and compute nodes participating in a given reservation or job are trusted to safeguard the credentials that are presented to them from the client initiating the reservation or job. To support alternative forms, the credentials parameters of scheduler requests may be represented in an extensible form (e.g., an XML infoset) that allows specification of the kind of credential being passed as well as the credential itself. Similarly, compute nodes running jobs may install passed-in credentials in the local operating system a manner that allows jobs to actually make use of them.

An example of an alternative type of job credential is digitally signed delegation certificates that confer specific rights to specific parties. For example, client C may specify a certificate that allows meta-scheduler M to have read access to a particular file F. M may create a delegation certificate that confers to scheduler S that same read access right, and S may further delegate that right to N with another delegation certificate. When creating job J, N gives the chain of delegation certificates, including one conferring the read access right to J. J may then employ these credentials to actually perform a read request on F.

There are at least two types of extensions that one may consider including: purely additive extensions and extensions that modify the semantics of the underlying base-level design. Purely additive extensions add strictly new functionality to an interface or define additional resource types to which clients and schedulers may refer.

Modifying extensions fall into two categories. In one category, base case semantics remain unchanged to parties operating at the base (i.e. un-extended) level. In another category, base case semantics change for parties operating at the base level.

An example of a modifying extension that leaves the base-level semantics unchanged is adding at-most once semantics to interface requests. While these operations may have more tightly defined failure semantics, their functional semantics remain unchanged and base-level clients may safely ignore the extended semantics.

In one embodiment, extensions that change base-level semantics are disallowed since they violate a premise of base-level interoperability. For example, the creation of jobs at a particular (extended) scheduler may require that the client issue an additional explicit resource deallocation request once a job has terminated. Without change, base-level clients may not know to do this which may result in an incorrectly functioning system.

Extensions supported by an extended use case interface include:

1. Addition of operations described using Web Services Description Language (WSDL) or some other language, encoding, mechanism, or the like. This may be used to support additional functionality such as the addition of suspend/resume operations, for example. Additional parameters to existing operations may be defined with appropriate names to avoid potential tooling issues around "operation overloading". An example is adding a notification callback parameter to job creation requests.

2. Support for array operations and other forms of batching. Array operations may be used for queries or abort requests, for example. A client may selectively interact with jobs (as well as things like data files) in either an "object-oriented" fashion or in "bulk-array" fashion. An extension may allow name resource reservations, jobs, and schedulers by means of abstract names, independent of whether they may also be referred to by means of endpoint references (EPRs). Using WS-Names represents one way of doing this.

3. Extensions to state diagrams as described in more detail below.

4. Extensions to resource definitions and other declarative definitions (e.g. provisioning). These extensions may include two approaches an combinations thereof. For example, extensions define composable sets that cover specific "subjects" (e.g. graphics processing units) that may be of size one or larger. Clients and services may be configured to be able to deal with the power set of all possible meaningful combinations of these sets. In specifying these extensions to resource definitions, the individual definitions are independent of each other (i.e. the semantics of specifying A is unchanged by specifying B in the same description). In one embodiment, resource sets may be defined as "major" sets that broadly characterize particular (common) cases. "Aspect" sets may then be defined that extend major sets in particular, minor ways that cover various more special cases.

In another embodiment, if resource descriptions are used for "matchmaking" against other resource descriptions, then arbitrary resource types may be used whose semantics are not understood by the high performance computing (HPC) infrastructure, which may deals with them as abstract entities whose names may be compared textually and whose associated values may be compared textually or numerically depending on their data type. An exemplary matchmaking approach that may be used in this manner is exemplified by Condor's class ads system.

5. Extensions to representations of information. In one embodiment, information related to a job submission system is represented in the form of XML infosets. Additional types of resources may be specified beyond those assumed present in all systems. Schedulers and compute nodes that do not understand a particular resource type may, by default, return an error when they encounter an unknown resource specification. However, they may also be explicitly told to ignore unknown resource specifications.

6. Extensions that decompose functionality into "micro" protocols. Micro protocols may reflect things that occur at different times (e.g. resource reservation/allocation vs. resource use/job-execution) or that may be employed in a stand-alone manner (e.g. job execution vs. data transfer). In one embodiment, the base case involves interaction between a client and a scheduler for purposes of executing a job.

For example, a client may wish to independently reserve, or pre-allocate resources for later and/or guaranteed use. Note that this is different from simply submitting a job for execution to a scheduler that then queues the job for later execution—perhaps at a specific time requested by the client. For example, a meta-scheduler may wish to reserve resources so that it may make informed scheduling decisions about which "subsidiary" scheduler to send various jobs to. Similarly, a client may wish to reserve resources so as to run two separate jobs in succession to each other, with one job writing output to a scratch storage system and the second job reading that output as its input without having to worry that the data may have vanished during the interval that occurs between the execution of the two jobs.

As another example, a client may wish to query a scheduler to learn what resources may be available to it, without actually laying claim to any resources as part of the query (let alone executing anything using those resources). Scheduling candidate set generators or matchmaking services such as Condor may desire this functionality.

As another example, a client may need to transfer specific data objects (e.g. files) to and from a system that is under the control of a job scheduling service.

Micro protocols may have relationships to each other. For example, job execution may be able to accept a handle of some sort to resources that have already been allocated to the requesting client.

To allow interaction among clients and schedulers that understand differing levels of functionality, specialization of states provides a simple client that understands base scheduler states to still interact with more complex schedulers, albeit only understanding such schedulers' activities in base terms. Similarly, the specialization of states also provides a way for more complex clients to "down-level" their interactions with simpler schedulers in a well understood, interoperable manner. Specific specializations of the base scheduler state set—or of other specializations thereof that have been previously defined—may be defined using profiles.

An example of state specialization is that a profile may extend the "satisfied" reservation state to include the states "partially satisfied" and "fully satisfied," to represent the notion of a reservation that may start executing jobs because it has some, but not all, of the resources it has asked to reserve. A client understanding only the base reservation state diagram may still create reservations on a scheduler that implements partially and fully satisfied reservation states; it may simply ignore the specialization of the "satisfied" state in which reservations may be. Similarly, a client understanding the extended reservation profile still understands how to interact with a scheduler implementing only the base reservation states since those base states are a strict subset of those defined in the extended reservation profile.

An example of state specialization for jobs may involve the definition of a profile that extends the "running" job state to include the state "suspended," in order to represent the notion of a job that has started running but has been suspended from execution. One difference from the previous example is that the transition from "running" to "suspended" may be something that a client is able to request. In that case, the job scheduling profile may define additional interface operations that allow clients to request "suspend" and "resume" state transitions.

If multiple independent job scheduling profiles are defined the question arises of what it means for schedulers to implement multiple profiles, and how clients that may not understand some of the added profiles may still interact with the scheduler.

Figure 5:
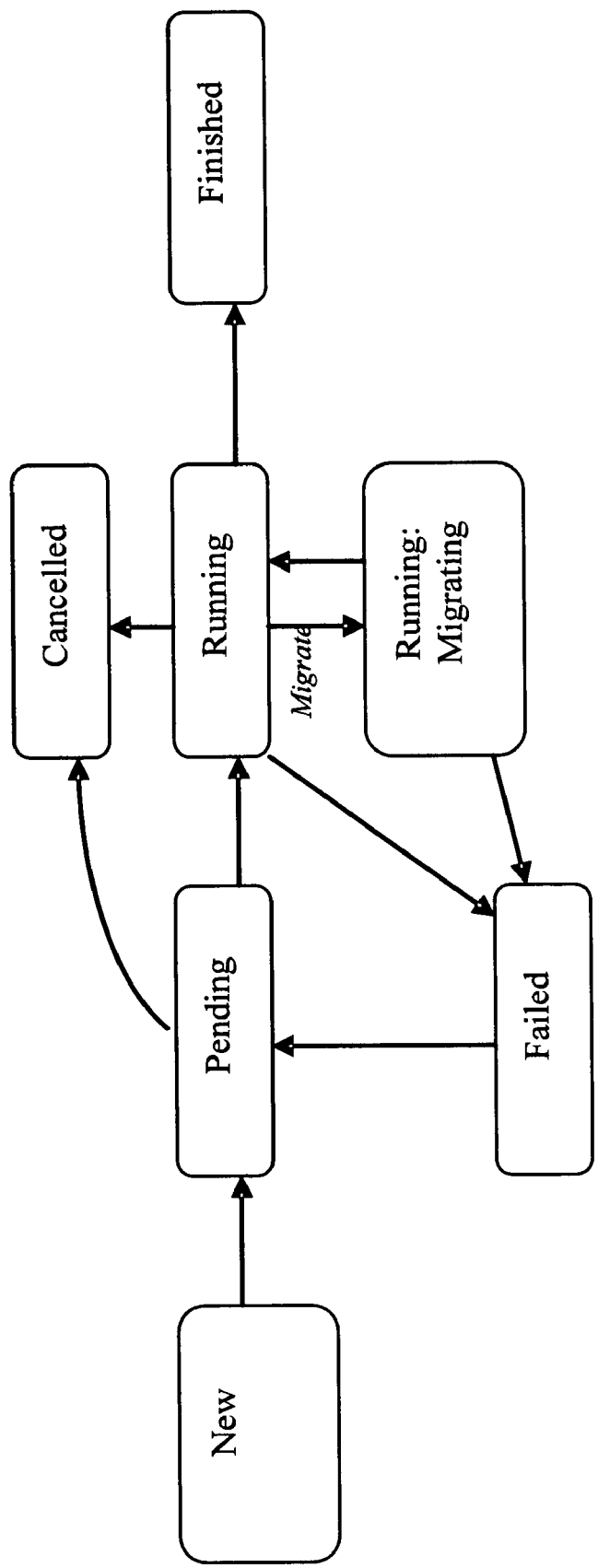
FIGS. 5-7 are block diagrams that represent separate, independent extensions of a base job scheduling protocol in accordance with aspects of the subject matter described herein.
Figure 6:
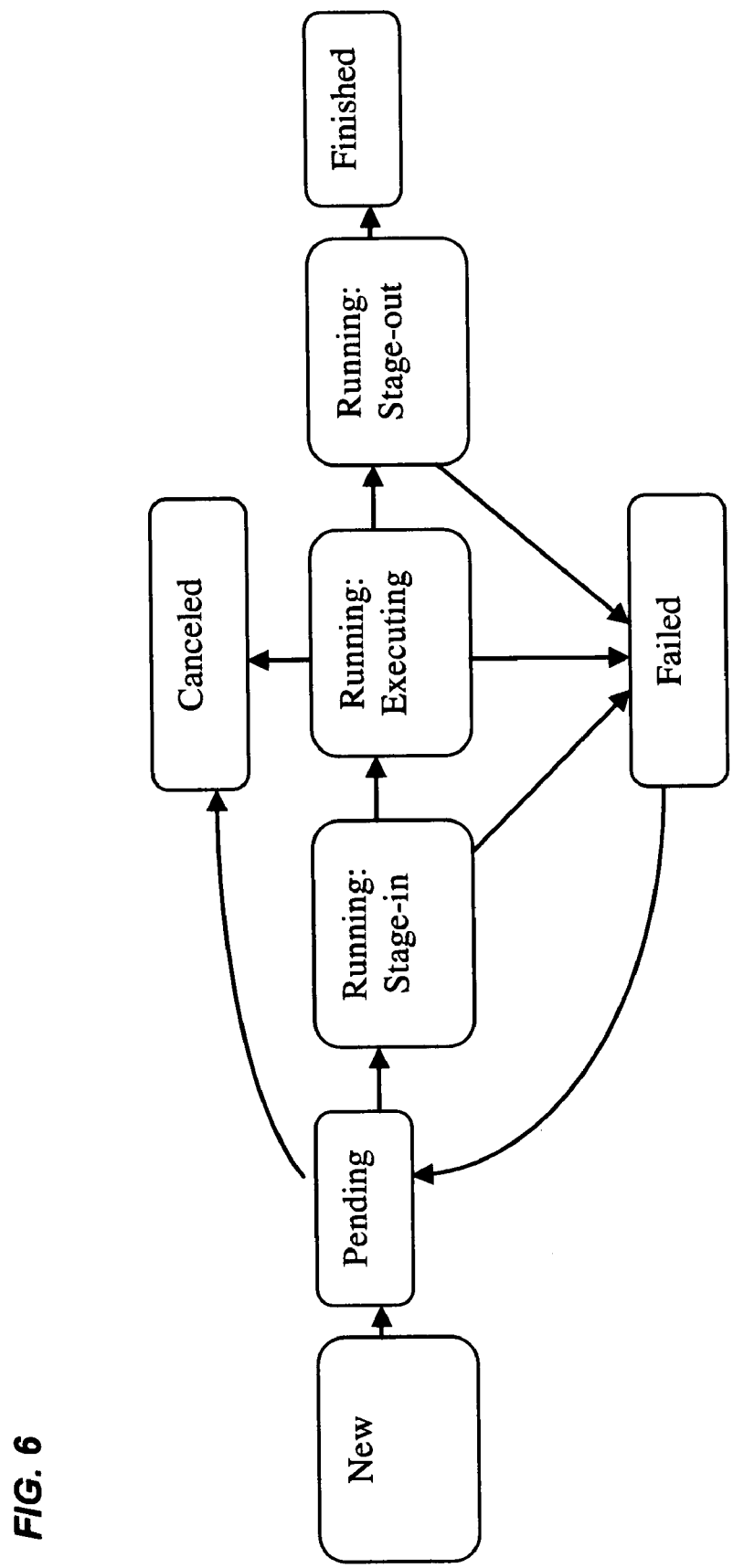
Figure 7:
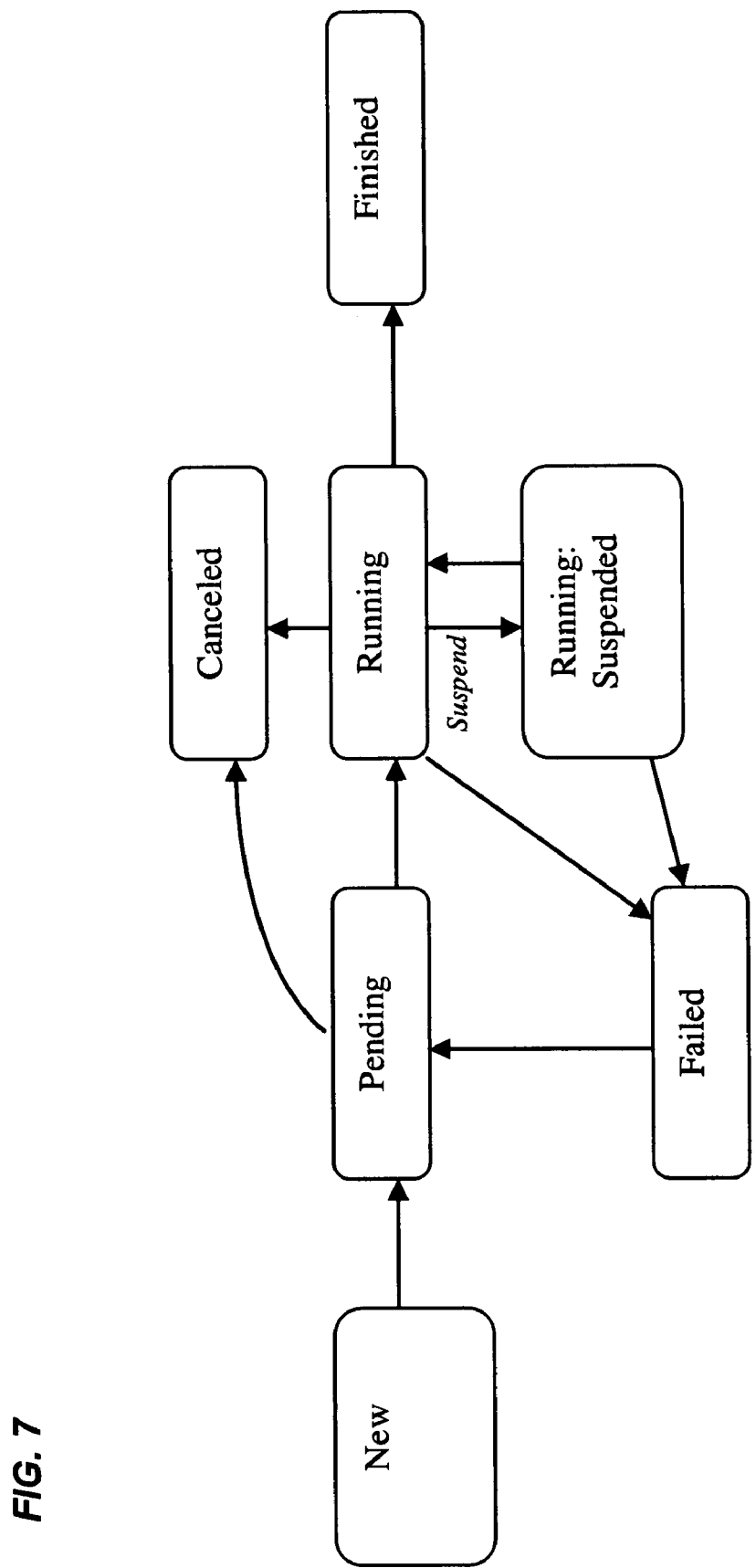

FIGS. 5-7 are block diagrams that represent separate, independent extensions of a base job scheduling protocol in accordance with aspects of the subject matter described herein. In FIG. 5, the base scheduling protocol is extended to support the notion of job migration. In FIG. 6, the base scheduling protocol is extended to support the notion of staging input data in from a client user to a compute node before a job executes on that compute node and then staging result data out from the compute node back to the client user after the job has finished executing. In FIG. 7, the base scheduling protocol is extended to support the notion of job suspension.

In one embodiment, these job scheduling profiles may represent "component" profiles since a scheduler may wish to implement more than one at the same time, yielding a scheduler capable of supporting both migration of jobs as well as data staging activities.

In a composition of profiles A, B, and C, a client may understand all three profiles and encounters a job in state "Suspended" that it wishes to migrate. The service with which the client is interacting may include logic that indicates that if the suspended job was originally in state "Stage-out" that a migrate request is both inapplicable and unnecessary. To facilitate proper functioning, the job's current state may describe the union of all the sub-states that the job is currently in.

To support schedulers wishing to implement more than one profile at least the following approaches may be taken:

1. Schedulers may implement a single job scheduling profile (or at most a set of completely independent profiles) and require profile designers to specify the power-set of all useful combinations of "component" job profiles.

2. Rules may be defined for how schedulers may individually create compositions of selected "component" job scheduling profiles in a manner that results in meaningful interfaces and implementations.

To support the composition of multiple job scheduling profiles, the following concepts may be added to the base job scheduling design:

1. A job scheduling profile may not add state transitions that are not "covered" by the state transitions already present in the base scheduling protocol and in the job scheduling profiles from which it is being extended. For example, no job profile may define sub-states of the "Pending" job state that may transition to the "Failed" job state. Thus, a client who understands fewer extensions than a scheduler it is interacting with will not see any unexpected state transitions.

2. Clients and schedulers are expected to understand the fault response "operation not applicable to current sub-state." When a client receives this response from a scheduler, the client may understand that the requested operation was not performed and the state of the scheduler and the respective reservation or job remains unchanged.

3. A scheduler is free to decide to implement a requested operation (and associated state transition) by deferring it until the respective reservation or job is in a more suitable state. In this case the scheduler may not reply until the operation has been performed successfully (assuming that it actually gets performed successfully once the reservation or job have transitioned to a suitable state). The scheduler may optionally include informative information in the response it sends to such an operation request.

4. In order to allow clients to understand as much as possible about the state of a reservation or job, state information includes the union of all sub-states that the reservation or job are currently in. For example, a job that was in state "Stage-in" and is currently migrating will have a state that includes both "Stage-in" and "Migrating." "Union states" of this sort may be represented as XML info-sets in which the top-level element is the base scheduling protocol state (e.g. "Running") and sub-elements exist for each job profile sub-state that the reservation or job is logically in.

In adding these concepts, clients may sometimes have requested operations rejected due to inapplicability, but they will not see reservation or job state transitions that they do not understand. Furthermore, by defining the notion of "union states," clients may be given as much information as possible about the current state that a reservation or job is in.

Base Case

In an embodiment, a base use case may include one or more of the following characteristics:

1. Users may make the following requests to a job scheduler:

A. Submit a job for execution, with a specification of resource requirements. The scheduler may return either a scheduler-relative unique jobID or a fault reply.

B. Query a specific job for its current state. Users may only query jobs that were submitted using their user credentials. The scheduler may return either a standard description of the specified-job's state, including its current execution state and a copy of the submission request, or a fault reply if the job is unknown.

C. Cancel a specific job. Users may only cancel jobs that were submitted using their user credentials. The scheduler may return either an indication that the cancellation succeeded or a fault reply.

D. List jobs. Users may request a list of the IDs of all jobs that have been submitted using their user credentials. The scheduler may return either a list of jobIDs or a fault reply.

2. The state diagram for jobs that have been submitted by a client to a job scheduler includes three states: pending, running, and finished. A job is in the pending state while it is waiting to run. Once the scheduler has dispatched the job to actually run on resources that have been allocated to it, the job is in state running. When the job terminates—for whatever reason—it enters the finished state. Jobs may terminate because they successfully exit, exit with an error code, get cancelled by someone, or because the resources they depend on fail in some manner.

3. In one embodiment, a small set of "standard" resources may be specified in resource descriptions, such as number of CPUs/compute nodes needed, memory requirements, disk requirements, and the like. A set of comparison operations that may be used in a description is defined. Equality of string values and numeric relationships among pairs of numeric values are provided in the base use case.

4. Once a job has been submitted it may be cancelled, but its resource requests may not be modified.

5. Data access issues are considered to be out-of-band, e.g. because of the presence of a distributed file system. Stated somewhat differently, data access is considered to be an application issue rather than something that is supported as part of the underlying base use case.

6. Program provisioning is also considered to be out-of-band. That is, programs are assumed to be pre-installed—either directly on the compute nodes of the cluster or on something like a distributed file system that is accessible from the nodes of the compute cluster.

7. Creation and management of user security credentials are considered to be out-of-band. Users are assumed to have the necessary credentials needed to submit both data and work to the compute cluster. Note that this covers, among other scenarios, systems where all jobs are run using "anonymous" credentials and also systems where users explicitly stage any private data they wish to use to common "pool" storage facilities.

8. The compute cluster's job scheduler is reachable at a well-known communications endpoint. Thus there is no need for directory services beyond something like DNS.

9. Management of the system resources (i.e. compute nodes) and services of the compute cluster is out-of-band and indeed opaque to users of the cluster. This is not to say that there is not a standard means of managing a compute cluster.

10. For fault tolerance:

A. If a job fails due to system problems then it the client is responsible for resubmitting the job as a new job. In other words, the job scheduler may not automatically rerun the job.

B. The scheduler may fail but keeps information about jobs it has received on persistent storage. The scheduler may discard information about jobs that have finished longer than a given time period ago, with the value for that time period being a selectable or set value (e.g., one day). If persistent storage fails then all job information may be assumed lost.

C. Failure of the scheduler may cause currently running jobs to fail.

11. Jobs eventually time out and are garbage collected if they do not finish of their own accord or get cancelled by a user request.

12. When a job exits (for whatever reason), information is kept about the following: Whether it exited successfully, with an error code, or terminated due to some other fault situation. How long it ran in terms of wall-clock time. This information is kept for a time period determined by the administration policy of the compute cluster.

13. Which scheduling policies a scheduler supports is out-of-scope. Similarly, concepts such as quotas and other forms of service level agreements (SLAs) are out-of-scope.

14. Jobs are completely independent of each other. The notion of dependencies among jobs is out-of-scope.

15. A job consists of a single program running on a single compute node; infrastructure support for parallel, distributed programs—such as MPI programs—is not assumed.

16. Reservation of resources separate from allocation to a running job is out-of-scope. That is, things like reserving resources for use at some particular time in the future or for purposes of implementing quality-of-service or SLAs is not supported.

17. Interactive access to running jobs is out-of-scope. It is not prohibited, but is viewed as being an application-level concept that has no system support.

Below are described interface operations using a pseudo interface description language. The first argument to each interface operation is the Web services endpoint reference (EPR) that the operation request should be sent to. A representation language such as Job Submission Description Language (JSDL) is assumed to be used for describing resources in the parameters and results of each interface operation.

In one embodiment, a base interface includes one or more of the following operations:

1. CreateJob (schedulerEPR, resourceDescr, credentialsDescr, lifetime)→jobDescr: Create a job. The characteristics of the job, such as executable to run, time limits, and resource requirements, are described by 'resourceDescr'. 'resourceDescr' is an XML infoset describing the resources the client desires to reserve to the job. 'credentialsDescr' is an XML infoset describing the credentials that should be associated with the job. If 'lifetime' is not null then it represents the maximum length of time that this job should be allowed to exist before the scheduler is free to terminate it and reclaim the resources allocated to it. 'jobDescr' is an XML infoset describing the created job. Two of the top-level elements in the returned infoset are a job ID, which uniquely identifies the job, and a 'jobEPR', which is an endpoint reference for the job. Other elements describe its current run state (e.g. 'pending', 'running', 'finished'), and the resources allocated to it.

2. QueryJob (jobEPR, jobID, queryDescr)→jobDescr: Return a description of the current state of the job designated by 'jobID'. 'queryDescr' is an XML infoset that describes what kind of information the scheduler should return about the task. If it is null, then a full description should be returned. The base case allows requesting either the current state of a job (e.g. 'running') or a full description of the job.

3. CancelJob (jobEPR, jobID): Terminate the job's execution.

4. QueryScheduler (schedulerEPR, queryDescr)→schedulerDescr: Query the indicated scheduler for the current state of any resources it manages and/or any jobs (and related tasks) it manages. 'queryDescr' is an XML infoset that describes what kind of information the scheduler should return. If it is null then the scheduler returns a full descriptions of the resources and jobs it is currently managing. As described earlier in the security section, all requests are subject to access controls that may limit what information is actually returned to any given request. The base case allows requesting either resource information (e.g. compute nodes' status), job information, or both.

Finally, 'schedulerDescr' also returns an element describing the time at which the scheduler's persistent database was last initialized. Clients may use this to reason about when a scheduler's persistent storage may have been reset by either a failure or an administrative operation.

The set of states in which a job may be in the base state is described above in conjunction with FIG. 2.

As described previously, the scheduler is expected to maintain a persistent record of jobs that it has created and must maintain that record for some scheduler-specific amount of time after a job has terminated. Thus, clients may expect QueryJob to return meaningful results about a job even after the scheduler has crashed and recovered unless the scheduler's persistent storage has failed. Since QueryScheduler returns an indication of the last time that a scheduler's persistent storage was initialized, the clients may compare that time to the time that they submitted a job in order to estimate whether information about that job may have been lost.

Although the scheduler is expected to maintain persistent metadata about the jobs it has created, there is no requirement that the scheduler execute a job exactly once. The scheduler is expected to execute any job it has created at most once. That is, it may record that it has created a job and then not manage to actually run it (or run it to conclusion, since it is generally undefined what it means to successfully "run" a non-atomic activity such as a job). However, once it has recorded the creation of a job, a scheduler may not run it more than once.

In the base case, there is no assumption that request or reply messages will be reliably delivered. Hence, clients keep track of the jobIDs they receive from CreateJob requests and may rely on QueryScheduler requests to obtain accurate information about which jobs a scheduler has knowledge about.

In one embodiment, credentials for running a job are treated as an opaque XML element whose syntax and semantics are understood by the particular compute nodes on which the job runs.

System administration, including modifying the state of the scheduler (e.g. managing policies), is done via a separate system management interface.

Although an exemplary base case and an exemplary base interface have been described above, it will be recognized that many other base cases and base interface may be defined without departing from the spirit or scope of the subject matter described herein. In these bases cases, one or items that have been described above as "out-of-scope" may be "in-scope." Furthermore, one or items that have been indicated as "not supported" may be supported.

Extended Use Case

In one embodiment, an XML infoset is used to describe the extension set that a scheduler implements. In other embodiments, other languages or structures may be used. Extensions described in more detail below may be applicable to more than one interface (e.g. both the basic job interface as well as the extension resource reservation interface).

In the base use case, operations such as Create, Query, and Cancel (as well as relevant operations in extensions) refer to a single entity, such as a job. In this extension, an array equivalent for each operation is also supported by the scheduler. The array operations have the same parameter and return value signature as the corresponding non-array operations, except that an array of elements is used/returned in place of each element in the corresponding non-array operation.

Exemplary array versions of the base interface operations are shown below:

CreateJobs (schedulerEPR, resourceDescr[ ], credentialsDescr[ ], lifetime[ ])→jobDescr[ ]
QueryJobs (jobEPR, jobID, queryDescr[ ])→jobDescr[ ]
CancelJobs (jobEPR, jobID[ ])

Some operations (e.g., QueryScheduler) may not have a corresponding array operation. In one embodiment, a scheduler may export an indication of whether a particular array extension is supported by the scheduler.

Array operations may experience partial failures. For example, a 'CancelJobs' request may contain some number of valid jobIDs and one or more jobIDs that are invalid. The return messages for these operations may intersperse fault indications with the data that is normally returned for a successful completion of a requested operation. In one embodiment, this is performed via XML infosets.

Clients may wish to receive notifications about state changes to the jobs (or other things) they have created. In an embodiment, an extension may define an additional version of an interface's creation operations that includes a notification parameter. For example, the parameter may specify a WS-Eventing notification EPR.

Clients may wish to control what, and how much information they receive from the various query operations they perform. This type of extension defines additional specifiers that clients may include with a query operation to control what information is returned.

There are at least three different ways of specifying query modifiers:

In one embodiment, a well-known enumeration type is defined for each type of information that may be returned to a client. In particular, separate enumeration types may be defined for resource, job, and scheduler information. In another embodiment, information may be represented as sets of properties and clients allowed to retrieve information by means of specifying subsets of properties to return. In yet another embodiment, XPath queries or the like may be used to select which parts of an infoset to return.

To deal with potentially unreliable delivery of the base case, an extension may make operation requests idempotent. In particular, clients may supply a unique identifier to associate with a request. A scheduler encountering a second request containing the same identifier may know that the second request message is a duplicate and discard it.

So that one client may not interfere with another client's requests, each request may be securely associated with a particular client. In addition, client-supplied identifiers may be unique with respect to the set of identifiers supplied under the auspices of a particular client credential.

Highly-available schedulers may rebind their service interface to a different EPR when they fail over to a backup instance. An extension to the base case supports this by introducing the notion of EPR resolution. In one embodiment, service interfaces may be bound to different EPRs by using WS-Names instead of plain EPRs and separate abstract names.

For interface extensions, the following may be provided:

1. A job may be marked as idempotent, so that schedulers supporting this sort of re-execution capability may know which jobs to re-execute when necessary.

2. Additional or extended resource definitions may be provided. This type of extension involves defining additional standard resource descriptions, as well as extended descriptions of standard resource descriptions.

3. Additional operations may be defined in extensions. For example, a ModifyJob operation that requests a change to the set of resource requirements/limitations for a job may be defined as:

ModifyJob (jobEPR, resourceDescr)→jobDescr

One requirement/limitation of a job includes changing the lifetime of the job. Other requirements/limitations of a job may also be modified via the ModifyJob operations in other embodiments.

Another set of operations that may be defined in an extension is suspend/resume. This extension involves both additional operations as well as state specialization as a suspended sub-state may be used. It will be recognized that many other operations may also be defined in extensions without departing from the spirit or scope of the subject matter described herein.

4. Additional scheduling policies may also be provided for in extensions. In particular, extensions may indicate how schedulers advertise the set of scheduling policies they implement, such as weighted, fair-share scheduling, support for back-fill, various kinds of quotas, and various kinds of quality-of-service guarantees, and how clients may indicate/control which scheduling policies to apply to their jobs (subject to scheduler approval).

In some embodiments, clients may have no control over the scheduling policies that get applied to their jobs by a given scheduler. However, a client may decide which scheduler to select for job submission based on the scheduling policies the scheduler advertises. In one embodiment, the scheduler may advertise policies in the same manner used to advertise the set of extensions the scheduler implements in general.

One way of exporting a choice of scheduling policies is via different submission queues. In one embodiment, an extension may involve standardizing a set of scheduling queues that schedulers may make available.

It will be recognized that many other extensions, as well as more expressive forms may be defined to allow additional scheduling policies without departing from the spirit or scope of the subject matter described herein. For example, an extension may define notions of hard and soft quota limits.

5. Extensions may also be defined to support parallel and/or distributed programs. To launch a distributed program like an MPI program onto multiple compute nodes, a client needs to be able to request how many compute nodes are necessary/desired for the program. To support this, an extension may define additional well-known resource description terms, such as number-of-nodes, number-of-cpus-per-node, and the like.

Applications like MPI programs may also assume an existing infrastructure, such as super multi purpose daemons (SMPDs) for things like establishment of communication links and aggregation of distributed program outputs. A scheduler may advertise in its extension set descriptions which infrastructures it has available (or may instantiate on demand).

Clients may need to stage data to the jobs they wish to run, as well as stage data back once a given job has completed. More generally, when aggregate activities such as parameter sweeps and workflows are involved, clients may need to be able to specify which data sets to make available between various jobs running on behalf of a client, as well as which data sets to make available to various combinations of multiple jobs.

In one embodiment, a data staging extension allows jobs to specify which files (and directories of files) to stage in before a job is executed and which files to stage out after the job has terminated. In one embodiment, files may be staged to and from the local file system of the compute node(s) on which a job will run and the descriptions of which files to stage may include indications of which transport methods to use when staging them. If a distributed/network file system is available, then staging may be to and from that file system instead of the local file systems of compute nodes.

Other extensions may be used to deal with several additional facets of data staging, including the following:

A. Data sets that will be used by multiple jobs may be marked in such a fashion that the job scheduling infrastructure will not inappropriately delete them at the wrong time—and will know when it may finally delete them.

B. Placement (and potentially replication) of data sets to be used or shared by multiple jobs may be optimized by the scheduling infrastructure in order to avoid unnecessary data transfer traffic. In one embodiment, this may be accomplished via job descriptions that employ abstract file locations when specifying where data is to be staged.

C. Many organizations only allow data staging to occur as a two-step process that involves clients explicitly copying data into a demilitarized zone (DMZ) storage system and the scheduling infrastructure then explicitly copying that data out of the DMZ into a storage infrastructure that is strictly internal to the organization. The latter step, which is a "pull" step, may be dealt with as an instance of data staging of the form that has already been introduced. However, the former step is a "push" step that is driven by the client. An extension supporting this kind of two-step data staging may include a definition that sufficiently specifies the name space offered by the DMZ storage system and a set of allowed data transfer protocols that clients and schedulers may use to stage files both into and out of the DMZ.

7. Extensions may also be defined for provisioning. The base case assumes that a job will execute a program that is already accessible from the compute node(s) on which it will run at the time the job is to run. Provisioning extensions may deal with at least the following cases:

A. A job may wish to specify specific versions of various components, such as code libraries, with which to execute a job. An extension may allow customization of things like libraries or other such components.

B. Installation of a user-supplied program may involve more than simply copying the relevant program files to an accessible file system location. For example, a program may need to first run an installer package that sets up various infrastructure components or injects various pieces of information into the computing infrastructure. Note that installation of user-supplied programs that involves changes to the underlying computing infrastructure are often subject to administrator approval and hence a provisioning extension in support of such programs may define job fault responses that indicate that a user-supplied program was not allowed to be installed.

C. After a job has terminated, provisioned programs and components may need to be uninstalled. One nuance that an extension may deal with is the issue of when a program may be uninstalled. If program installation involves creation of a single instance that is to be shared by all job instances running on a compute node then uninstallation may occur once all jobs employing that program have terminated. A provisioning extension that supports these kinds of programs may define how clients (or applications) indicate to the scheduling infrastructure what the correct uninstallation policy is.

8. Another extension allows allow clients to submit multiple jobs to a scheduler with an indication that certain jobs may not be started until others have been completed. Making this static form of workflow visible to job schedulers allows them to optimize resource allocation strategies and avoids a long-running client workflow orchestrator to hang around and be reachable in order for a workflow to make progress through multiple jobs.

An extension in support of these kinds of static workflows involves allowing clients to specify inter-job dependencies to schedulers in a well-defined manner. In one embodiment, clients may be allowed to supply unique job identifiers and be able to include a job dependency list as part of the resource description infoset they supply to the CreateJob operation.

Resource reservation extensions may also be provided. Extension to support this sort of functionality may involve an additional interface supporting the following operations:

CreateReservation (schedulerEPR, resourceDescr, credentialsDescr, lifetime)→rsrvDesc: Create a new reservation at the scheduler indicated by 'schedulerEPR'. This operation is similar to the CreateJob operation, except that it specifies resources to be reserved and does not specify a particular job to run using those resources.

QueryReservation (rsrvEPR, rsrvID)→rsrvDescr: Return a description of the current state of a reservation.

ModifyReservation (rsrvEPR, rsrvID, resourceDescr) →rsrvDescr: Request a change to the set of resource requirements/limitations for a reservation and/or to the lifetime of the reservation.

CancelReservation (rsrvEPR, rsrvID): Terminate the reservation and cancel all associated resource reservations/allocations. Also causes the termination of all jobs associated with the reservation.

Figure 8:
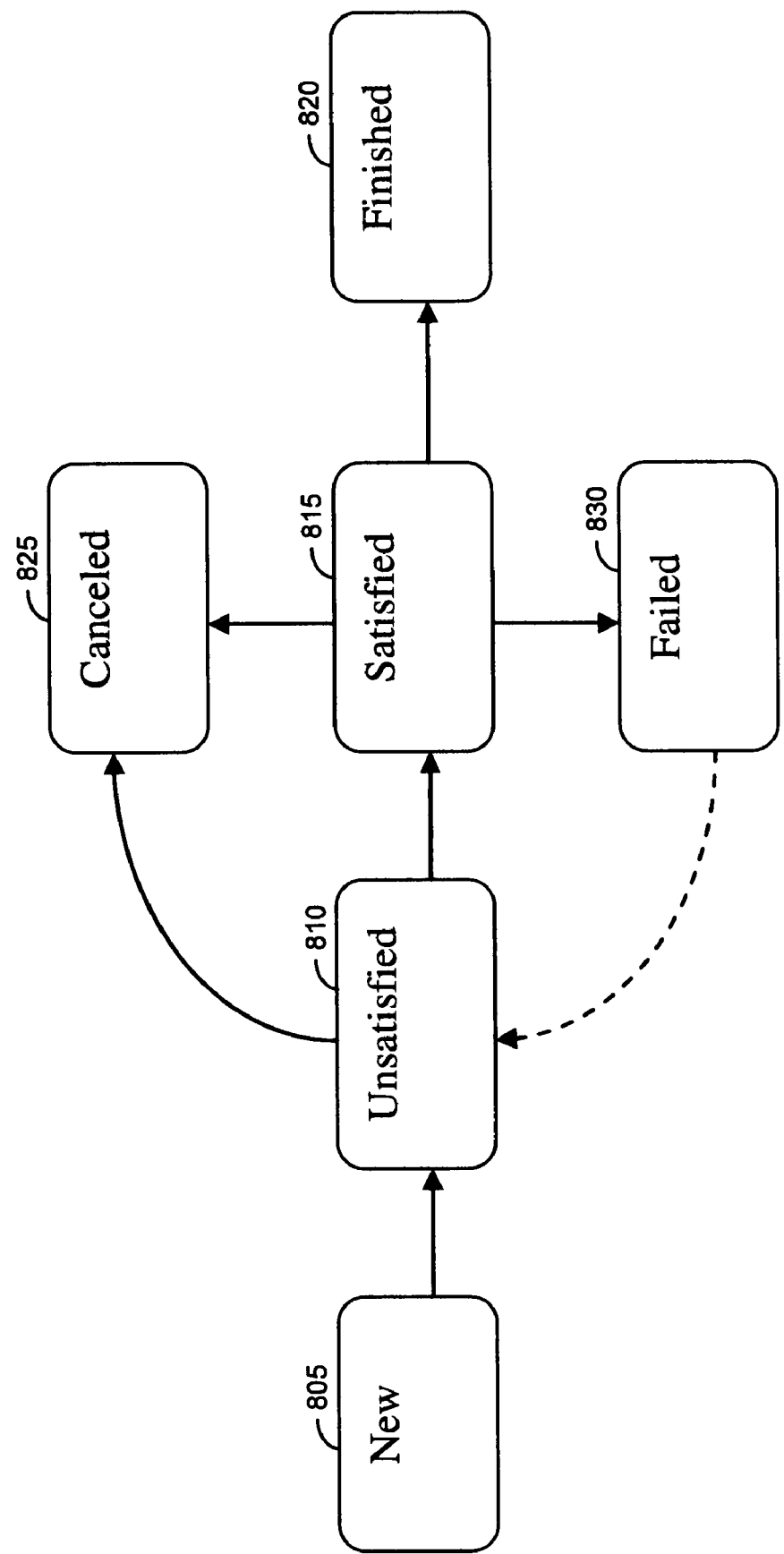
FIG. 8 is a state diagram that illustrates states in which a reservation may be in accordance with aspects of the subject matter described herein.

FIG. 8 is a state diagram that illustrates states in which a reservation may be in accordance with aspects of the subject matter described herein. The set of states in which a reservation may be includes:

New 805: This is the start state, in which a request to create the reservation has not yet been submitted to the scheduler by a client.

Unsatisfied 810: The scheduler has received the reservation request and is trying to reserve the resources that the reservation has requested.

Satisfied 815: The scheduler has reserved the resources requested.

Finished 820: The reservation has terminated. This is a terminal state.

Cancelled 825: The client—which may be some system administrator (and hence not necessarily the client who originated the request to create the reservation)—has issued a cancel reservation request. This is a terminal state.

Failed 830: The reservation has failed due to some system error condition, such as failure of a compute node that was providing some (or all) of the resources reserved to the reservation. This is a terminal state.

In another embodiment, an extension may allow failed reservations to return to the unsatisfied state if they have been marked with the "retry" option.

Reservations have finite lifetimes. A reservation that has been in existence for longer than its specified lifetime may be automatically cancelled by the system and the resources that it holds may be released for use by others.

Reservations may also be explicitly terminated via client cancel requests.

The lifetime of a reservation may be queried and modified by clients (with modifications subject to scheduler approval). In one embodiment, a reservation expires if no job has been run in its context for a specified amount of time. This may be implemented, for example, by allowing the scheduler to automatically extend its lifetime value every time a job is submitted under its context. Clients may specify whether this auto-extension policy is employed for a reservation when the reservation is created or by subsequently sending an appropriate reservation modification request to the scheduler.

An extension supporting multiple schedulers may augment the base interoperability interface in several ways:

First, an extension for information returned from query operations may support both a flat and a hierarchical representation format. In one embodiment, this may be performed by having the extension supply normative definitions for these representations.

Second, in order to avoid scheduling cycles, an extension may include client scheduler lists, which specify the list of clients that have been involved with any given job or reservation creation request. In one embodiment, this extension may define alternative CreateJob and CreateReservation operations that include a 'clientSchedulerList' parameter.

Third, an extension may support the extended security model described previously.

Finally, an extension may provide a scheduler announcement operation such as AnnounceScheduler (schedulerEPR, announcerDesc). This extension may inform the indicated scheduler of the presence of another scheduler. In one embodiment, 'announcerDesc' may be represented by an XML infoset that contains an endpoint reference at which the announced scheduler may be reached. It may also include additional information about the announced scheduler.

Use Cases

Below are some exemplary extensions that may be implemented to address various environments. It should be understood that the extensions mentioned below are exemplary and that other extensions may be used in other environments without departing from the spirit or scope of the subject matter described herein.

For example, if various compute nodes have special-purpose vector processing hardware attached to them, in an extension, an XML description may be defined for a "vector processing unit" resource. 'resourceDescr' parameters employed in 'CreateJob' and 'CreateReservation' may then include references to this new resource type as appropriate. Similarly, the infosets returned from those operations, as well as from 'QueryJob' and 'QueryReservation' requests may be structured to include information about vector processing units.

In the base case, 'QueryScheduler' returns full information about the status of a scheduler and the resources it is managing. In an embodiment, 'queryDescr' may be used to modify what information gets returned. In the embodiment, an enumeration type may allow designation of several standard subsets, such as 'resource-info-only,' 'job-info-only,' and 'scheduler-internal-information.'

Following are some examples of resource reservation state specializations:

1. The "satisfied" state may be extended to include "partially satisfied" to represent reservations for which the scheduler has found sufficient resources to allow for the execution of some jobs, but for which it is also still trying to find additional resources.

2. The "satisfied" state may be extended to include a provisioning step during which resources allocated to a job are provisioned. Similarly, the "finished" state may be extended to include a clean up step during which resources that belonged to a job are de-provisioned. To represent these specializations, the "satisfied" state may be extended to include a "provisioning" sub-state and the "finished" state may be extended to include a "cleanup" sub-state.

3. The "unsatisfied" state may be extended to include "holding" a reservation at the scheduler in a state where the scheduler knows of the reservation but is not actively trying to satisfy its resource requirements. A "place-on-hold" state transition takes a reservation from a state of "unsatisfied" to a state of "hold," and a "release" state transition takes a reservation in state "hold" back to the state "unsatisfied." These state transitions may be requested from a client or system administrator through an extension of the reservation interface with corresponding PlaceOnHold and Release operations.

4. The "unsatisfied" state may be extended to represent that a scheduler is "negotiating" with some other resource owner in order to obtain reservation of some resource.

Some examples of job state specializations include:

1. The "running" state may be extended to include a suspended sub-state, with "suspend" and "resume" state transitions connecting it to the "running" state. This may be implemented by extending the job interface with corresponding Suspend and Resume operations.

2. The "running" state may be extended to include a "migrating" sub-state, with a "preempt" state transition going from the "running" state to the "migrating" sub-state and a "migrated" state transition going from the "migrating" sub-state back to the "running" state. This may be implemented by extending the job interface with a Preempt operation.

3. In order to run a job on some compute nodes the executable and associated data/resources needed by the executable may first need to be provisioned on the relevant compute node. Similarly, once the job has finished, it may be helpful to clean up the state of the compute node that was used. For example, to clean up the state of a compute node, the executable program file and associated data/resources may be erased. In one embodiment, to implement the provisioning, the "running" state may be extended to include a "provisioning" state to represent jobs for which provisioning is currently occurring. Similarly, to implement a clean up, the "finished" state may be extended to include a "clean-up" state to represent jobs for which clean up is taking place.

Provisioning and clean up may also involve the staging of user data to and from the compute node(s) on which a job will execute. To represent the difference between a job for which user data is being staged versus provisioning/clean up of the job's executable resources, the "provisioning" and "clean-up" sub-states may be specialized to have their own sub-states. For example, "provisioning" may be specialized to "stage-user-data-in" and "provision-executable-resources," while "clean-up" may be specialized to "stage-user-data-out" and "clean-up-executable-resources."

4. The pending state may be extended to include a "hold" state, with "hold" and "release" state transitions taking the job from the "pending" state to the "hold" state and back again. As with reservations, in one embodiment, this may be implemented with the inclusion of PlaceOnHold and Release operations in the job interface.

Extensions may be provided to support multiple scheduler queues. For example, a scheduler may support multiple scheduler queues, which may represent different priority levels, different projects, and the like. The queue in which to place a reservation or job may be represented as an additional type of resource description. For example, a client wishing to place a job in the "EngineeringSchool" queue may specify that constraint in the 'resourceDescr' parameter of the 'CreateJob' message the client sends. Similarly, reservation and job descriptions returned by 'QueryReservation' and 'QueryJob' may include resource descriptions that describe the queue that includes the reservation or job. In one embodiment, moving a reservation or job from one queue to another may be implemented using the 'ModifyReservation' or 'ModifyJob' requests, with appropriate resource description parameters.

Meta-schedulers may forward jobs to cluster head-node schedulers. In this example, a meta-scheduler may employ the services of a forest of compute clusters, each of which is managed by its own dedicated scheduler.

In one embodiment, each cluster scheduler may send an 'AnnounceScheduler' message to a meta-scheduler in order to make itself known to the meta-scheduler. The meta-scheduler may periodically query each cluster scheduler it knows about using 'QueryScheduler' to determine the resources that are available on the compute cluster being managed by that scheduler.

When the meta-scheduler wants to employ a compute cluster, the meta-scheduler may issue a 'CreateReservation' request to the cluster's scheduler in order to reserve resources on the cluster. Subsequent 'CreateJob' requests may then be used to cause jobs to be attached to the created reservation and executed on the reserved compute nodes of the cluster.

A 'CreateReservation' request from a client of the meta-scheduler may result in multiple 'CreateReservation' requests being made by the meta-scheduler to various cluster schedulers. Similarly, 'CreateJob' requests from a client of the meta-scheduler may be directed to one of several different cluster schedulers, depending on where the meta-scheduler wants to execute any particular task.

Clients viewing the status of their jobs and tasks may see that status information in a flat or hierarchical view. If a client requests a flat view, then resources may be listed according to the compute nodes they belong to and tasks may be listed according to the compute nodes on which they are currently running on or according to the scheduler at which they are currently pending (which may be a cluster scheduler or the meta-scheduler itself). If a client requests a hierarchical view, then a tree of schedulers and compute nodes may be presented. The view may show resources being listed with the appropriate leaf nodes of the tree and jobs being listed with the appropriate leaf nodes, if they are currently executing, and with the appropriate intermediate (scheduler) nodes if they are currently pending execution.

A request that a reservation or job be retried or re-executed represents an example of an extension operation whose implementation may ripple through multiple schedulers. Retrying to make a reservation may involve releasing all currently reserved resources and then reserving new ones. To do this, the meta-scheduler may cancel all resource reservations that it has made with cluster schedulers and may then requeue the reservation request internal to itself. The internal requeuing then results in new resource reservation requests being sent to appropriate cluster schedulers.

Re-executing a job may involve cancelling it and placing it back in the queue if it is currently running. If a job is running, then the meta-scheduler may issue a cancel request to the cluster scheduler of the compute cluster on which the job is running. The meta-scheduler may then requeue the task local to itself.

Cluster schedulers monitor the compute nodes they manage and re-execute jobs that were running on failed compute nodes if they are marked as re-executable. By periodic query messages, the meta-scheduler may monitor the cluster schedulers it employs. If a query request results in a fault reply, the meta-scheduler may assume that the corresponding cluster scheduler is unreachable and may remove all its associated resources from the list of available resources. If several more query requests result in fault messages then the meta-scheduler may assume that the entire compute cluster may have crashed and may requeue reservations and jobs that were running on the cluster for submission elsewhere.

Network partitions and compute cluster head node failures may result in orphan reservations and jobs. Orphan reservations and jobs may get deallocated/cancelled as soon as they are detected by the meta-scheduler.

In one embodiment, if user names and passwords are being used for credential delegation, the meta-scheduler includes these when making 'CreateReservation' requests to cluster schedulers. The meta-scheduler may trust the cluster schedulers to not misuse the credentials that it sends to them, just as its clients trust it to not misuse them when they send their credentials to it.

As mentioned earlier, schedulers are free to employ whatever means they please to implement reservations and jobs "within" themselves. In another embodiment, a different form of credentials delegation other than username/password may be used between a meta-scheduler and cluster schedulers such as one used within a compute cluster.

In one embodiment, cluster schedulers may forward jobs to a meta-scheduler. In this embodiment, a client may submit reservations and jobs directly to the meta-scheduler or to a cluster scheduler (e.g., if the compute cluster is owned by the client).

In this embodiment, a cluster scheduler may determine whether to keep a reservation and its jobs local to its own cluster or submit them to the meta-scheduler. Furthermore, the meta-scheduler may not assume that it is the only consumer of resources advertised to it by cluster schedulers. That is, sometimes the meta-scheduler may issue a 'CreateReservation' request to a cluster scheduler that may not be honored because the cluster scheduler has already reserved its resources to a concurrent 'CreateReservation' request from a local client.

Cluster scheduler decisions for direct, "local" clients may be based on policy. In one embodiment, one exemplary policy is to have all reservations from local clients get dealt with locally except when their requests may not be satisfied by the local cluster's resources.

When the meta-scheduler receives a fault reply back from a 'CreateReservation' request to a cluster scheduler, the meta-scheduler may looks for resources elsewhere. Eventually, the meta-scheduler will be informed of the changed state of the cluster scheduler that resulted from local clients' requests to the cluster scheduler through subsequent status query messages to the cluster scheduler.

When cluster schedulers are able to forward jobs to a meta-scheduler, a different hierarchical view of resources, reservations, and jobs may result. In one embodiment, the local cluster scheduler is at the top of the tree and the meta-scheduler is an intermediate node. In embodiments in which clients submit jobs directly to a meta-scheduler rather than a local scheduler, the meta-scheduler is at the top of the tree and the cluster scheduler is an intermediate node.

As mentioned previously, jobs may be forwarded through multiple levels. In one embodiment, when there are multiple meta-schedulers in a system, all the schedulers may form a single hierarchy. In another embodiment, schedulers may "compete" with each other for resources. In the first embodiment, there may be a generalization of the meta-scheduler to cluster scheduler, with multiple layers of schedulers residing between clients and compute nodes. In the second embodiment, clients may pick from multiple schedulers, each of which has the possibility of reserving the same resources from other schedulers within the system. This allows for competition between schedulers, as well as for the presence of "specialty" schedulers that implement a variety of different scheduling algorithms.

In both of the above embodiments, 'CreateReservation' resource reservation requests may fail due to race conditions among concurrently issued requests. Schedulers may also perform cycle detection by checking the list of schedulers that are already involved in a 'CreateReservation' request and rejecting requests that would create cycles.

For cycle scavenging embodiments, desktop machines may announce themselves to a desktop cycle scavenging meta-scheduler. Once the meta-scheduler receives an announcement message from a desktop machine, the meta-scheduler may start sending periodic 'QueryScheduler' requests to the desktop to monitor the desktop's state. When a query request returns a fault message, the meta-scheduler may assume that the desktop machine is no longer available. The meta-scheduler may then stop sending query requests to the machine. If the desktop machine wishes to advertise its availability at some later time, or if it recovers from a crash some time later, the desktop machine may then send out another 'AnnounceScheduler' message to the meta-scheduler.

In terms of all other interactions, the meta-scheduler may treat desktop machines in a similar fashion as a cluster scheduler treats its compute nodes. In addition, the meta-scheduler may employ different scheduling algorithms from those used in a dedicated compute cluster.

Condor's model of scheduling specifies that clients reserve resources directly from the compute nodes that have them. In the Condor model, schedulers merely act as "match makers" that provide clients with hints about which compute nodes may have the resources they need. To accommodate a Condor-style model using aspects of the subject matter described herein, a scheduler may keep track of the current state of the compute nodes in a system by sending periodic 'QueryScheduler' requests to each compute node or by signing up for 'AnnounceScheduler' messages from each compute node to learn of significant state changes.

Condor clients may query a scheduler for the availability of desired resources and then send a reservation request to all the compute nodes described in the query reply message they receive from the scheduler. To do so, Condor clients may employ 'QueryScheduler' instead of 'CreateReservation' to a system meta-scheduler to learn about available resources. The 'queryDescr' may be used to indicate that a Condor matchmaking specification is being passed in as part of the 'queryDescr' infoset. When a Condor client receives a reply to its 'QueryScheduler' request indicating that the requested resources appear to be available, it sends 'CreateReservation' requests directly to each compute node mentioned in the 'QueryScheduler' reply. The Condor client may then run tasks directly on the resources it has reserved.

In this embodiment, some or even all the 'CreateReservation' requests may fail since compute nodes may have received other 'CreateReservation' requests during the time between when the client queried the scheduler for status information and the time the client sent its requests to the compute nodes. In that case, the client may query the scheduler for additional resource information in order to find additional compute node candidates to which to send 'CreateReservation' requests.

Figure 9:
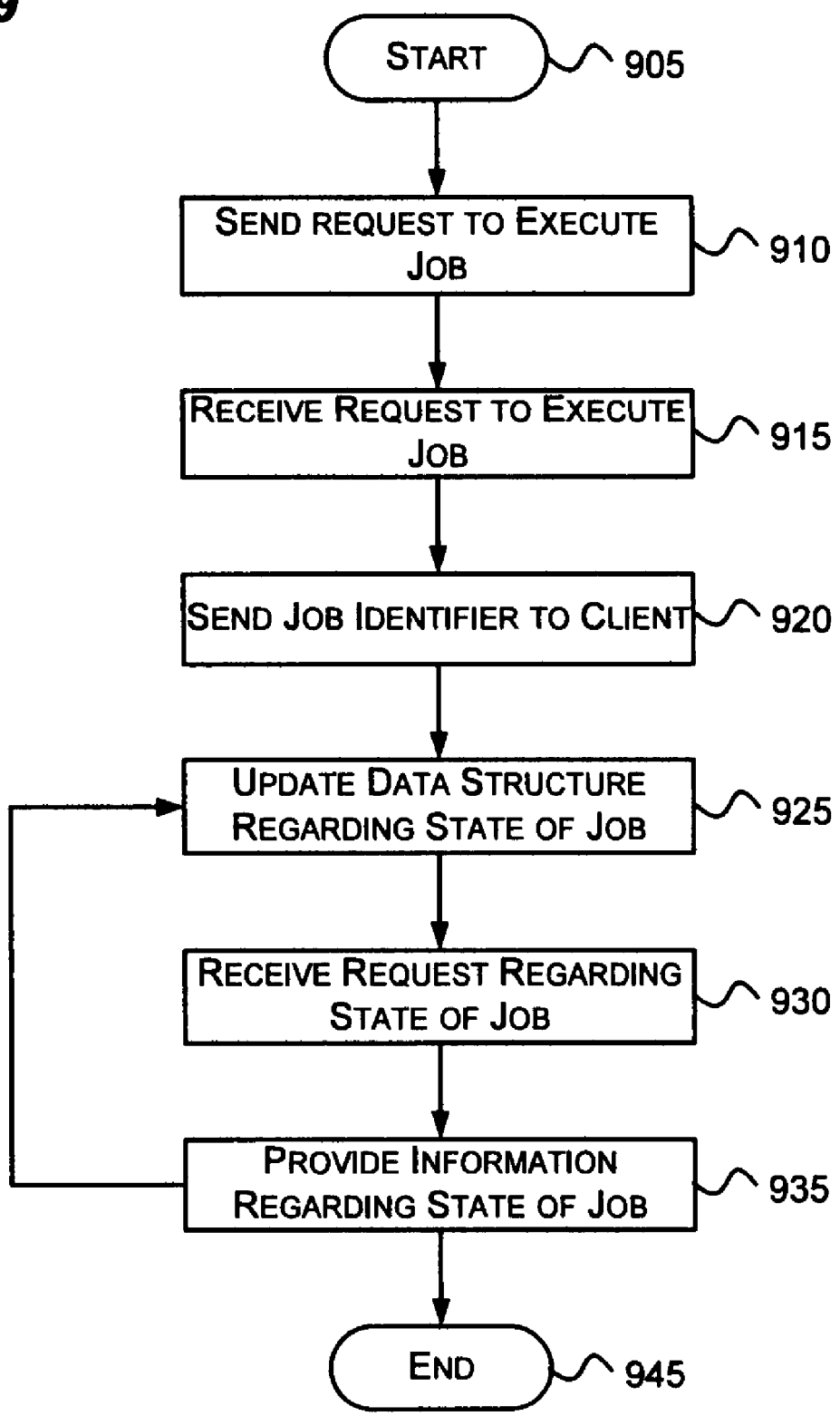
FIG. 9 is a flow diagram that generally represents exemplary actions that may occur in accordance with aspects of the subject matter described herein.

FIG. 9 is a flow diagram that generally represents exemplary actions that may occur in accordance with aspects of the subject matter described herein. At block 905, the actions begin.

At block 910, a client (or a scheduler acting as a client) sends a request to execute a job to a scheduler. For example, referring to FIG. 4, the meta-scheduler 415 may send a request to execute a job to the scheduler 425. The request may include an indication of what extensions the client supports.

At block 915, the scheduler receives the request. For example, referring to FIG. 4, the scheduler 425 receives the request from the meta-scheduler 415.

At block 920, the scheduler sends a job identifier to the client so that the client may be able to reference the job in future communications. For example, referring to FIG. 4, the scheduler 425 sends a job identifier of JobID=125 to the meta-scheduler 415.

At block 925, the scheduler updates a data structure (e.g., a state machine) regarding the state of the job. For example, referring to FIG. 2, the scheduler may update a data structure to indicate that the job has entered the pending state 210.

At block 930, the scheduler receives a request from the client for a status update regarding the state of the job. The actions associated with block 930 may occur any time after the job identifier has been sent to the client. For example, referring to FIG. 4, the meta-scheduler 415 may periodically query the scheduler 425 to determine the status of jobs it has submitted to the scheduler 425.

At block 935, the scheduler provides the information to the client. The information may be provided based on the extensions the scheduler and the client both support. For example, if the client and scheduler both support substates, the scheduler may indicate a substate (e.g., running:migrating). For example, referring to FIG. 4, the scheduler may inform the meta-scheduler that the job is currently in the stage-out substate of the running state.

The actions associated with blocks 925-935 may continue until the job is completed or reaches a terminal state.

At block 945, the actions end. The actions above are not intended to be all inclusive of all actions that may occur in job submission and are selected as an exemplary subset of such actions. Furthermore, in other embodiments, some of the actions may be combined or may be performed in parallel without departing from the spirit or scope of the subject matter described herein.

Figure 10:
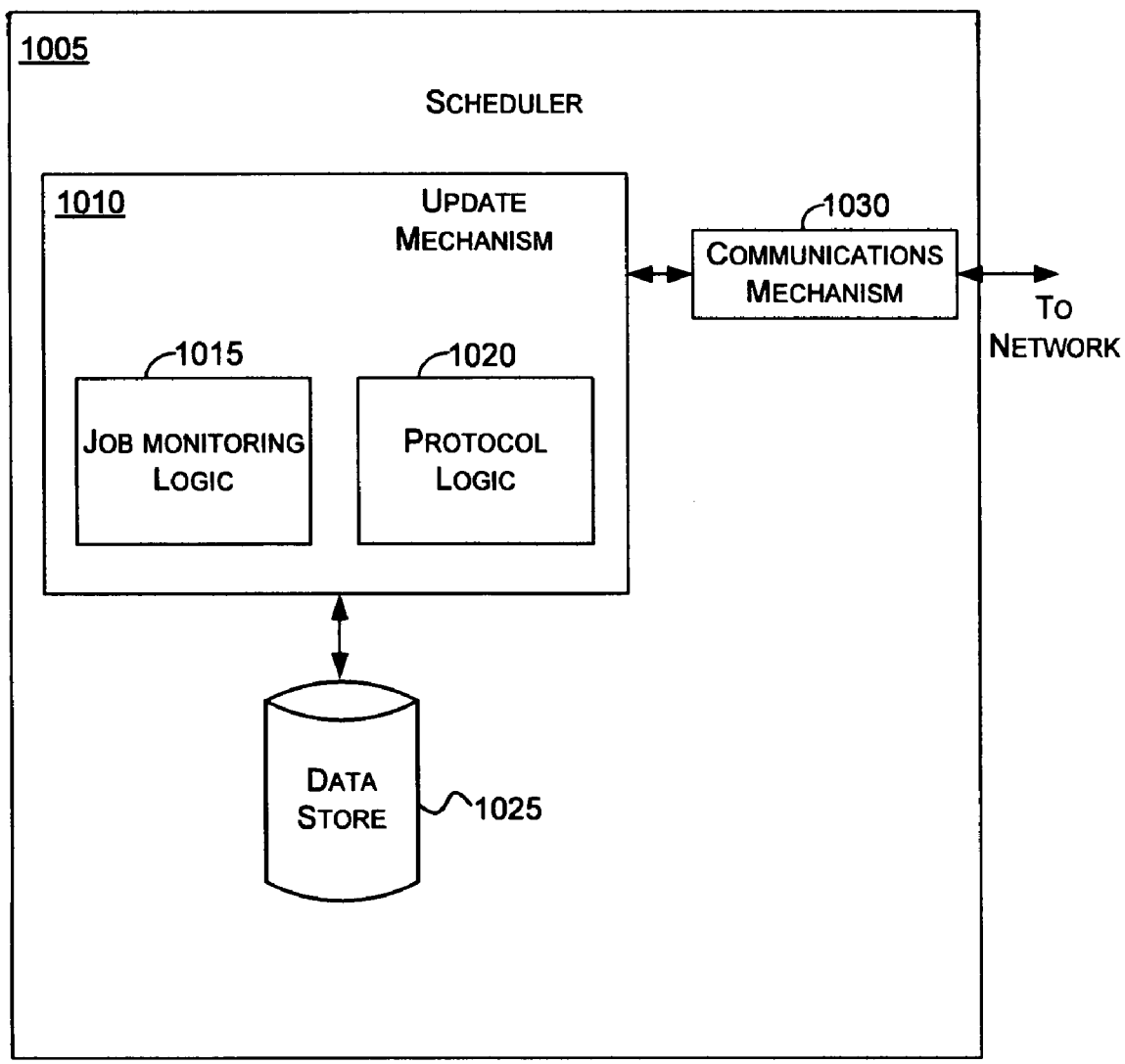
FIG. 10 is a block diagram that represents exemplary components of a scheduler in accordance with aspects of the subject matter described herein.

FIG. 10 is a block diagram that represents exemplary components of a scheduler in accordance with aspects of the subject matter described herein. The scheduler 1005 includes an update mechanism 1010 a data store 1025, and a communications mechanism 1030, the update mechanism 1010 includes job monitoring logic 1015 and protocol logic 1020.

The update mechanism 1010 uses the job monitoring logic 1015 to monitor jobs that the scheduler has been asked to execute. As the status of the jobs change, the update mechanism 1010 updates the state of the jobs in the data store 1025. Each job may have a data structure devoted to its state and associated data.

The scheduler 1005 uses the communications mechanism 1030 to communicate with clients and other schedulers as appropriate. The protocol logic 1020 may implement the base case and any extensions the scheduler 1005. In other embodiments, blocks may be combined or further divided and other blocks may be added to perform various aspects that have been described above with regard to schedulers without departing from the spirit or scope of the subject matter described herein.

As may be seen from the foregoing detailed description, aspects have been described related to job submission. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
  receiving, at a scheduler, a request to execute a job;
  updating a data structure with state information that indicates a state and a sub-state associated with the job, wherein the state is one of a plurality of states that may be associated with the job depending on a status of the job, wherein the sub-state is one of a plurality of sub-states associated with the state based on the status of the job within that state, and wherein each of the plurality of states is not a sub-state of any other state of a state machine associated with the status of the job; and
  providing information including the state or the state and the sub-state of the job.

2. The method of claim 1, wherein the request indicates whether an entity making the request recognizes the sub-state.

3. The method of claim 2, wherein the state and the sub-state are provided if the entity recognizes the sub-state.

4. The method of claim 2, wherein the sub-state is not provided if the entity does not recognize the sub-state.

5. The method of claim 2, wherein the sub-state is provided regardless of whether the entity recognizes the sub-state and is ignored by the entity if the entity does not recognize the sub-state.

6. The method of claim 1, further comprising adding the sub-state to the state machine without adding any additional transitions between any of the plurality of states.

7. The method of claim 1, wherein the information includes other data about the job in addition to the state and the sub-state.

8. A hardware computer-readable storage medium having computer-executable instructions stored thereon, which in response to execution by a computer, cause the computer to perform actions comprising:
  sending, to a scheduler, a request to execute a job, wherein states and sub-states are associated with a current status of the job, and wherein at least one of the states includes at least two sub-states;
  receiving an identifier that is associated with the job; and
  receiving information that indicates a current state and a current sub-state of the job, wherein the current state of the job is based upon the current status of the job, wherein the current sub-state of the job is based upon a status of the job within the current state, and wherein each of the plurality of states is not a sub-state of any other state of a state machine associated with the status of the job.

9. The computer-readable medium of claim 8, wherein the request includes an indication of a sub-state to indicate in the information.

10. The computer-readable medium of claim 8, wherein the identifier uniquely identifies the job to the scheduler.

11. The computer-readable medium of claim 8, wherein the current sub-state is one of a plurality of sub-states that the job is currently in, and wherein the information further indicates the plurality of sub-states.

12. The computer-readable medium of claim 8, wherein the states are represented by a state machine having transitions between the states, further comprising extending the state machine without adding a transition between the states.

13. The computer-readable medium of claim 8, wherein the states comprise new, pending, running, failed, cancelled, and finished.

14. The computer-readable medium of claim 8, wherein the current sub-state includes at least one of running:migrating, running:stage-in, running:executing, running:stage-out, and running:suspended.

15. In a computing environment, an apparatus, comprising:
  at least one processor;
  a data store communicatively connected to the at least one processor and operable to store data that includes information about a state of a job;
  a communication component operable to receive requests and to send some or all of the information about the state of the job; and
  a component operable to monitor the state of the job and to update the information as the state of the job changes, wherein at least one of the states includes at least one sub-state, wherein the communication component is further configured to send information regarding the at least one of the states including sending information about the at least one sub-state, wherein the job may be in multiple sub-states simultaneously, and wherein each of the plurality of states is not a sub-state of any other state of a state machine associated with the status of the job.

16. The apparatus of claim 15, wherein all of the information about the state includes state and sub-state information that indicates the state and one or more sub-states that the job is in.

17. The apparatus of claim 16, wherein the communication component is further operable to send all of the information in response to a request from a client that is capable of recognizing the one or more sub-states.

18. The apparatus of claim 16, wherein the communication component is operable to omit information regarding the one or more sub-states when communicating with a client that is not capable of recognizing the one or more sub-states.

19. The apparatus of claim 16, wherein the communication component is further operable to receive a list of schedulers involved in scheduling a job and further comprising a cycle detection component operable to detect cycles within the list.

* * * * *